(12) United States Patent
Hua et al.

(10) Patent No.: US 11,536,315 B2
(45) Date of Patent: Dec. 27, 2022

(54) MAGNETIC BEARING OF STATOR PERMANENT MAGNET MOTOR WITH MAGNETIC POLE BYPASSES AND BIAS FORCE ADJUSTING METHOD THEREOF

(71) Applicant: SOUTHEAST UNIVERSITY, Nanjing (CN)

(72) Inventors: Wei Hua, Nanjing (CN); Zhiheng Zhang, Nanjing (CN); Qifan Xu, Nanjing (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 17/770,226

(22) PCT Filed: Nov. 29, 2021

(86) PCT No.: PCT/CN2021/133964
§ 371 (c)(1),
(2) Date: Apr. 19, 2022

(65) Prior Publication Data
US 2022/0373027 A1    Nov. 24, 2022

(30) Foreign Application Priority Data

Apr. 22, 2021    (CN) .......................... 202110436751.8

(51) Int. Cl.
*F16C 32/04*    (2006.01)
*H02K 7/09*    (2006.01)

(52) U.S. Cl.
CPC ........... *F16C 32/0474* (2013.01); *H02K 7/09* (2013.01)

(58) Field of Classification Search
CPC .. F16C 32/0474; F16C 32/04; F16C 32/0406; F16C 32/041; F16C 32/0414;
(Continued)

(56) References Cited

U.S. PATENT DOCUMENTS 4,285,553 A    8/1981    Robinson
10,749,423 B2 *    8/2020    Hakala ................. H02K 41/033
(Continued)

FOREIGN PATENT DOCUMENTS

CN    103312103 A    9/2013
CN    203463494 U    3/2014
(Continued)

OTHER PUBLICATIONS

English translation for CN 113586609 (Year: 2021).*
English translation of CN 113285558 (Year: 2021).*

*Primary Examiner* — Ahmed Elnakib
(74) *Attorney, Agent, or Firm* — Muncy, Geissler, Olds & Lowe, P.C.

(57) ABSTRACT

The present invention discloses a magnetic bearing of a stator permanent magnet motor with magnetic pole bypasses and a bias force adjusting method thereof, and belongs to the technical field of power generation, power transformation or power distribution. A typical magnetic field loop formed by permanent magnets extending out of stator sections, radial magnetic conduction bridges, circumferential magnetic conduction bridges, magnetic collecting shoes, radial/axial working air gaps and magnetic conduction blocks of radial/axial magnetic field closed main loops is used for designing the magnetic pole bypasses, so as to achieve the distribution of the magnetic field energy with multiple paths and controllable magnetic field strength of the permanent magnets in the stator permanent magnet motor. The present invention further provides a bias magnetic circuit structure. The number of magnetic poles and the magnetic field strength of a bias magnetic field are adjusted by selecting the materials of connecting sections between magnetic collecting blocks and the volume embedded in adjacent magnetic collecting blocks, so as to adjust the bias force of the magnetic pole, the space at an end of a motor winding is used to the greatest extent, the axial length of a magnetic suspension bearing motor system is reduced, the dynamic performance of a rotor is improved, and the objectives of high compactness and high integration level of "a magnetic suspension bearing and a permanent magnet motor system" are achieved.

9 Claims, 18 Drawing Sheets

(58) Field of Classification Search
CPC ............... F16C 32/0421; F16C 32/044; F16C 32/0448; F16C 32/0461; F16C 32/0465; F16C 32/0476; F16C 32/0493; F16C 32/0444; F16C 32/0459; H02K 7/09; H02K 1/17; H02K 21/26; H02K 23/04; H02N 15/00
USPC .......................................... 310/90.5, 154.01
See application file for complete search history.

(56) References Cited

U.S. PATENT DOCUMENTS

| | | | |
|---|---|---|---|
| 2009/0091198 A1* | 4/2009 | Husband | H02K 21/44 310/46 |
| 2010/0072832 A1* | 3/2010 | Zhu | H02K 21/44 310/49.46 |
| 2013/0221771 A1 | 8/2013 | Kono et al. | |
| 2015/0104123 A1 | 4/2015 | Ertas et al. | |
| 2017/0093231 A1* | 3/2017 | Laing | H02K 1/02 |

FOREIGN PATENT DOCUMENTS

| | | |
|---|---|---|
| CN | 104716801 A | 6/2015 |
| CN | 104852538 A | 8/2015 |
| CN | 103312103 B | 8/2016 |
| CN | 106438691 A | 2/2017 |
| CN | 107769502 A | 3/2018 |
| CN | 108712043 A | 10/2018 |
| CN | 109268391 A | 1/2019 |
| CN | 109322973 A | 2/2019 |
| CN | 109681525 A | 4/2019 |
| CN | 110748562 A | 2/2020 |
| CN | 111425523 A | 7/2020 |
| CN | 113323963 A | 8/2021 |
| DE | 2917217 A1 | 11/1979 |
| EP | 3719976 A1 | 10/2020 |
| JP | 2008069964 A | 3/2008 |
| WO | WO2019/102060 A1 | 5/2019 |

* cited by examiner

MAGNETIC BEARING OF STATOR PERMANENT MAGNET MOTOR WITH MAGNETIC POLE BYPASSES AND BIAS FORCE ADJUSTING METHOD THEREOF

TECHNICAL FIELD

The present invention discloses a magnetic bearing of a stator permanent magnet motor with magnetic pole bypasses and a bias force adjusting method thereof, relates to electrical and mechanical transmission equipment, and belongs to the technical field of power generation, power transformation or power distribution.

BACKGROUND

At the present stage, motor systems with permanent magnet motors as the main power have been widely used in the fields of industrial and mining metallurgy, new energy vehicles, aerospace, precision machine tools, military weapons, etc. In order to meet the specialized needs of different application fields and operating conditions, the types and structures of motors are also constantly enriched.

Unlike a traditional rotor permanent magnet motor, a stator permanent magnet motor has a permanent magnet located on one side of a motor stator, which overcomes the defects of complex structure, high manufacturing cost, complex processing technology, large equivalent air gap, difficult rotor cooling and the risk of irreversible demagnetization of the traditional rotor permanent magnet motor. Therefore, stator permanent magnet motors have received extensive attention from scholars at home and abroad in recent years. The research team of the inventors has also been committed to the basic theory and application research of stator permanent magnet motors, and has systematically studied various types of stator permanent magnet motors, such as flux switching motors, alternating winding motors, split winding motors and flux reversing motors. However, existing stator permanent magnet motors generally use mechanical bearings. In the process of application, the mechanical bearings face the risk of failure caused by the defects such as overheating, electrical corrosion, vibration and noise due to mechanical friction and shaft current, which limits the reliability of the stator permanent magnet motors to a certain extent.

In 1842, British physicist Earnshaw discussed the technology of magnetic suspension bearings. Subsequently, the theory and technology of design, control and application of magnetic suspension bearings continued to emerge. A permanent magnet bias type magnetic suspension bearing having the characteristics of low energy loss, lower stiffness and lower damping has obvious advantages compared with a pure current type magnetic suspension bearing. In the invention patent with a publication number CN110748562A and titled "SURROUNDING PERMANENT MAGNET BIAS AXIAL-RADIAL MAGNETIC SUSPENSION BEARING", and the invention patent with an application number CN201811504644.9 and titled "MAGNETIC SUSPENSION BEARING AND MOTOR" applied by Yu Chunmin, Deng Zhiquan, et al. of Nanjing University of Aeronautics and Astronautics, and the invention patent with an application number CN201811414823.3 and titled "FIVE-DEGREE-OF-FREEDOM MAGNETIC SUSPENSION FLYWHEEL" applied by Sun Jinji, et al. of Beijing University of Aeronautics and Astronautics, a permanent magnet is used as a bias magnetic field of a magnetic suspension bearing, and a permanent magnet bias type magnetic suspension bearing is tried to replace a mechanical bearing of a permanent magnet motor, thereby achieving the stable and reliable operation of a system including "a permanent magnet bias type magnetic suspension bearing and a permanent magnet motor" at a high rotation speed, and realizing low mechanical friction loss at the same time. Internationally, the Swiss Federal Institute of Technology, the University of Virginia, USA, the University of Maryland, USA, the University of Tokyo, Japan, etc. have also carried out a lot of research on permanent magnet bias magnetic suspension bearings and magnetic suspension bearing motors, and related products have been used in several industries.

However, in an existing system including "a permanent magnet bias type magnetic suspension bearing and a permanent magnet motor", the permanent magnet bias type magnetic suspension bearing and the permanent magnet motor are used as independent components. As a result, compared with a system including "a mechanical bearing and a permanent magnet motor", the system including "a permanent magnet bias type magnetic suspension bearing and a permanent magnet motor" has a complex structure and a large volume. A too long rotating shaft of the system including "a permanent magnet bias type magnetic suspension bearing and a permanent magnet motor" brings complex rotor dynamics problems, which also limits the rotation speed increase and wider application of the system. In a bearingless switched reluctance motor with a composite rotor structure disclosed in a Chinese patent with an authorization announcement number CN103312103B, a solution for simplifying the structure of the system including "a permanent magnet bias type magnetic suspension bearing and a permanent magnet motor" is provided. The rotor structure of the switched reluctance motor is divided into a torque rotor and a suspension force rotor, and only one set of windings is used on stator teeth to realize the decoupling of suspension force and torque. However, there is a risk that the decoupling control effect will be affected by the change of an inductance curve due to deeply saturated nonlinear factors. A Chinese patent with a publication number CN111425523A discloses a hybrid radial permanent magnet bias magnetic bearing. The bearing uses a stator core of a traditional eight-pole motor as a main structure of a magnetic suspension bearing, and eight electromagnetic control magnetic poles and two permanent magnet bias magnetic poles are arranged, thereby improving the static bearing capacity of the bearing, and reducing the loss and volume. However, the use effect of the bearing is easily affected by installation angles and installation positions. Specifically, the bearing can only be installed vertically and is only adapted to horizontal motors. Therefore, the existing solution for simplifying the structure of the system including "a permanent magnet bias type magnetic suspension bearing and a permanent magnet motor" has limitations.

On the other hand, how to adjust the bias force of the magnetic suspension bearing motor to meet the bias force requirements of different application occasions is also a technical problem that needs to be solved urgently at present. A Chinese patent with an application number 201810702198.6 discloses a stator permanent magnet bias type five-degree-of-freedom bearingless asynchronous motor. A set of additional suspension windings is superimposed in a stator slot of a traditional asynchronous motor. A torque magnetic field and a suspension magnetic field generated by two sets of windings are independent of each other. However, the number of poles and strength of a permanent magnet bias magnetic field cannot be adjusted. An appropriate permanent magnet bias magnetic field cannot be obtained by adjustment according to different application occasions after installation.

In conclusion, designing a stator permanent magnet motor with magnetic pole bypasses and a magnetic suspension bearing motor system to achieve the purpose of multi-purpose utilization of the magnetic field energy of the stator permanent magnet motor has important theoretical significance and application value for improving the compactness of the system including "a permanent magnet bias type magnetic suspension bearing and a permanent magnet motor" and filling the blank of the adjustment technology of bias magnetic fields.

SUMMARY

In view of the defects of the above background art, an objective of the present invention is to provide a magnetic bearing of a stator permanent magnet motor with magnetic pole bypasses and a bias force adjusting method thereof, so that a permanent magnet magnetic field of the stator permanent magnet motor can achieve other purposes of magnetic field energy through the designed magnetic pole bypass. Specifically, through the magnetic pole bypasses, the magnetic field energy of a permanent magnet section extending out of a core is used as a permanent magnet energy source of a permanent magnet bias type magnetic suspension bearing, and the current in a coil of the magnetic suspension bearing is reduced by the bias magnetic field energy to achieve the inventive objectives of improving the compactness and integration level between the magnetic suspension bearing and the permanent magnet motor, thereby solving the technical problems of a complex structure of a permanent magnet bias type magnetic suspension bearing motor system and limitations of a system with a simplified structure.

In order to achieve the objectives of the present invention, the following technical solution is adopted in the present invention.

The present invention provides a magnetic suspension bearing of a stator permanent magnet motor with magnetic pole bypasses and a motor system including the magnetic suspension bearing. Two sides of the magnetic suspension bearing of the stator permanent magnet motor are respectively provided with two magnetic pole bypasses. Furthermore, the axial length of a stator permanent magnet is greater than the axial length of a motor stator section. A permanent magnet section of the stator permanent magnet extending out of a stator core increases the magnetic field energy for the magnetic pole bypasses. Based on the magnetic pole bypasses, two typical magnetic field closed main loops of the magnetic pole bypasses are provided. Specifically, a permanent magnet bias type radial magnetic suspension bearing and a permanent magnet bias type axial magnetic suspension bearing are respectively designed based on the magnetic pole bypasses for axial and radial magnetic field closed main loops. The above magnetic suspension bearing with magnetic pole bypasses and a stator structure form a magnetic suspension bearing motor system, the space at an end of a motor winding is used to the greatest extent, and the axial length of the magnetic suspension bearing motor system is reduced.

In the above technical solution, the magnetic pole bypass consists of permanent magnet sections extending out of cores, radial magnetic conduction bridges, circumferential magnetic conduction bridges, magnetic collecting shoes, radial/axial working air gaps and magnetic conduction blocks of a radial/axial magnetic field closed main loop. Preferably, the components in the magnetic pole bypass are made of silicon steel sheets or materials with good magnetic conductivity. Each of the components may be made respectively as an independent component. The magnetic pole bypass may also be made integrally as an integral component.

Preferably, two sides of the permanent magnet section extending out of the core are respectively provided with a radial magnetic conduction bridge. The axial length of the radial magnetic conduction bridge is equal to the length of the permanent magnet section extending out of the core. The two radial magnetic conduction bridges are in close contact with the permanent magnet section extending out of the core to form a "sandwich" structure.

Preferably, the circumferential magnetic conduction bridge is located on an inner side of the radial magnetic conduction bridge. The number of the circumferential magnetic conduction bridges is half of that of the radial magnetic conduction bridges. The circumferential magnetic conduction bridge and two radial magnetic conduction bridges in contact with the circumferential magnetic conduction bridge form a U-shaped structure, which is compact, stable and reliable in structure.

Preferably, the magnetic collecting shoe is in reliable contact with and fits to the radial magnetic conduction bridge and the circumferential magnetic conduction bridge. The number of the magnetic collecting shoes is equal to the number of the circumferential magnetic conduction bridges.

A magnetic suspension bearing motor system consists of a magnetic suspension bearing with magnetic pole bypasses and a motor. The type of the magnetic suspension bearing may be one or more of a permanent magnet bias type axial magnetic suspension bearing, a permanent magnet bias type radial magnetic suspension bearing, and a permanent magnet bias type radial and axial hybrid magnetic suspension bearing. A permanent magnet bias magnetic field is derived from the magnetic pole bypass.

Further, the permanent magnet bias type radial magnetic suspension bearing is located on an inner side of a motor stator winding coil and consists of a radial magnetic suspension bearing rotor, a connecting and fastening section, radial coils, radial magnetic poles and magnetic pole bypasses. The number of magnetic poles of the permanent magnet bias type radial magnetic suspension bearing is equal to the number of the stator permanent magnets, and the fault-tolerant ability is higher.

Preferably, the radial magnetic suspension bearing rotor is of a radial hollow structure. A motor rotating shaft can penetrate into an inner ring of the radial magnetic suspension bearing rotor. The fastening and reliable contact between the radial magnetic suspension bearing rotor and the motor rotating shaft may be achieved by means of interference fit, a key slot, etc.

Preferably, the connecting and fastening section is of a three-section integral structure including a base section, inter-shoe sections and inter-bridge sections, and may be made of non-magnetic-conduction and low-conductivity materials with certain mechanical strength and hardness, such as ceramics, stainless steel and high-temperature resistance plastics. The connecting and fastening section is embedded between two adjacent magnetic collecting shoes, magnetic poles and radial magnetic conduction bridges of the magnetic suspension bearing, and is in close contact with the above components to play a role in connecting and fastening all components to form a whole.

The permanent magnet bias type axial magnetic suspension bearing consists of an axial magnetic suspension bearing rotor, a connecting and fastening section, axial coils and magnetic pole bypasses. The number of magnetic poles of the permanent magnet bias type axial magnetic suspension bearing is equal to the number of the stator permanent magnets, and the fault-tolerant ability is higher.

Preferably, the axial magnetic suspension bearing rotor is of a three-section structure, so that a thrust disc has reliable mechanical strength. Three subsections may be independent components respectively or may be an integral component, and are usually made of materials with good magnetic conductivity, such as silicon steel sheets. The axial magnetic suspension bearing rotor is of an axial hollow structure. The motor rotating shaft can penetrate into an inner ring of the axial magnetic suspension bearing rotor. The fastening and reliable contact between the axial magnetic suspension bearing rotor and the motor rotating shaft may be achieved by means of interference fit, a key slot, etc.

Preferably, upper parts of axial magnetic poles are connected to the magnetic collecting shoes. Each of the axial magnetic poles includes a front magnetic pole and a rear magnetic pole. The front magnetic pole and the rear magnetic pole are of an "opposite L" structure. The front magnetic pole and the rear magnetic pole are respectively wound with a front coil and a rear coil in a concentrated manner.

A magnetic suspension bearing of a stator permanent magnet motor with an adjustable bias magnetic field includes a bias magnetic circuit structure consisting of stator permanent magnets, an outer fastening plate, magnetic conduction columns, magnetic collecting blocks, an intermediate fastening plate, magnetic conduction column fastening plates, connecting sections between magnetic collecting blocks, and magnetic field loop magnetic conduction blocks. The axial length of the stator permanent magnet is greater than the axial length of a motor stator core, thereby providing a permanent magnetic field for a bias magnetic circuit.

The connecting sections between magnetic collecting blocks are arranged in the magnetic collecting blocks to establish an equivalent bias magnetic circuit diagram of each of the components. The equivalent main magnetic flux of the bias magnetic field is adjusted through the connecting sections between magnetic collecting blocks, and the magnitudes of the bias forces generated by different stator permanent magnets are adjusted, thereby combining bias forces of different magnitudes and directions. Based on the designed bias magnetic circuit structure and the adjusting principle of the bias magnetic field in the embodiments, permanent magnet bias magnetic suspension bearings with different numbers of magnetic poles, magnetic field strengths and bias forces may be designed.

Compared with the prior art, the present invention has the following significant advantages.

(1) The present invention designs a stator permanent magnet motor with magnetic pole bypasses and a magnetic suspension bearing motor system. The principle of the magnetic pole bypass is intuitive. By designing magnetic pole bypasses of various topological structures and reasonably selecting the materials and geometrical shapes of stator permanent magnets, multi-path distribution of the magnetic field energy of the permanent magnet in the stator permanent magnet motor can be achieved, so as to meet the energy conversion need of the magnetic field energy of the stator permanent magnet for supplying the stator permanent magnet motor and the magnetic suspension bearing motor at the same time. Based on the stator permanent magnet motor with magnetic pole bypasses, a magnetic suspension bearing motor system is designed. The space at the end of the motor winding is used to the greatest extent. The axial length of the magnetic suspension bearing motor system is reduced. The dynamic performance of the rotor is improved. High compactness and high integration level of "the magnetic suspension bearing and a permanent magnet motor system" are achieved.

(2) The present invention designs a bias magnetic circuit structure of a magnetic suspension bearing of a stator permanent magnet motor with an adjustable bias magnetic field. The magnetic field of the stator permanent magnet is introduced into the magnetic suspension bearing of the stator permanent magnet motor through the magnetic conduction columns and the magnetic collecting blocks, so as to provide a bias magnetic field for the magnetic suspension bearing. That is, the bias magnetic field is derived from the permanent magnet of the stator permanent magnet motor. The number of the magnetic poles and the magnetic field strength of the bias magnetic field are adjusted by selecting the materials of the connecting sections between magnetic collecting blocks and the volume embedded in adjacent magnetic collecting blocks, so as to adjust the bias force of the magnetic pole. Through the combination of different bias forces of the magnetic poles, a bias magnetic field with an adjustable number of magnetic poles and magnetic field strength and bias forces are provided for the permanent magnet bias type magnetic suspension bearing, the load current and drive capacity are reduced to the greatest extent, and the current loss is reduced. Furthermore, the present invention simplifies the magnetic circuit of the adjustable bias magnetic field for the magnetic suspension bearing of the stator permanent magnet motor into an equivalent magnetic network, thereby being convenient for inspiring those skilled in the art to make technical innovations, design permanent magnet bias type magnetic suspension bearing structures meeting the needs of different fields, enrich the product types of the magnetic suspension bearing of the stator permanent magnet motor, and widen the application field of the magnetic suspension bearing system of the stator permanent magnet motor.

Figure 1:
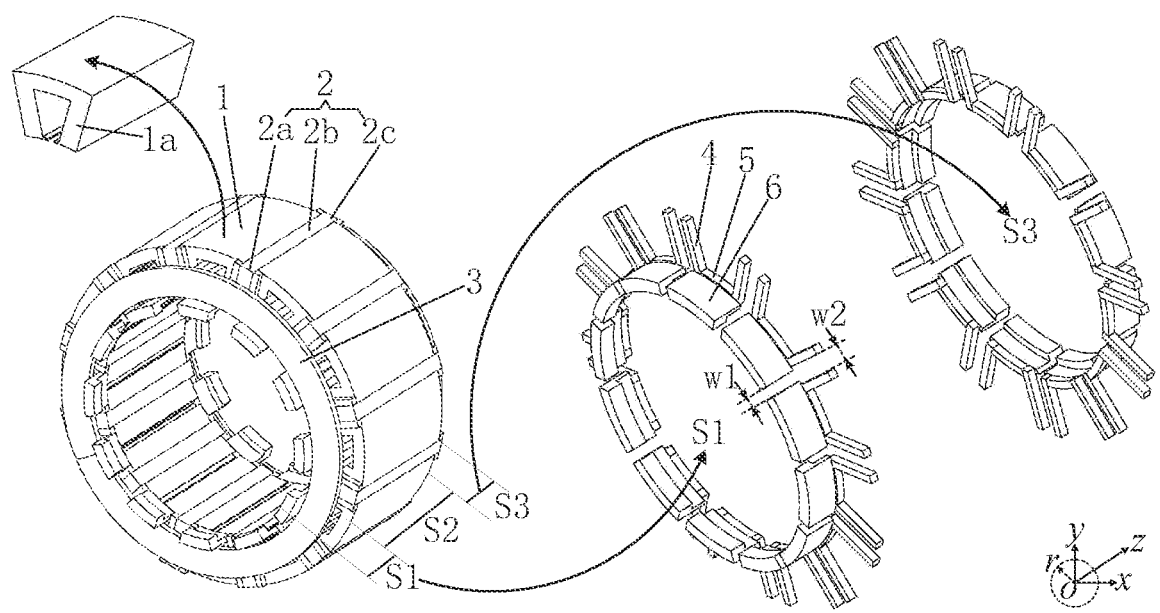
FIG. 1 is a schematic view of an overall structure of a stator of a stator permanent magnet motor with magnetic pole bypasses in the present invention.

Description of reference numerals: 1 denotes a modular stator core; 1a denotes a middle part of a stator tooth; 2 denotes a stator permanent magnet; 2a and 2c denote permanent magnet sections extending out of the core; 2b denotes a permanent magnet section in the core; 3 denotes a stator winding coil end; 4 denotes a radial magnetic conduction bridge; 5 denotes a circumferential magnetic conduction bridge; 6 denotes a magnetic collecting shoe; S1 and S3 denote magnetic pole bypass sections; S2 denotes a motor stator section; 101, 102 and 103 denote 3 adjacent modular stator cores; 201, 202, 203, 204, 205, 206, 207, 208, 209, 2010, 2011 and 2012 denote 12 stator permanent magnets; 401a and 401b as well as 402a and 402b denote 2 adjacent groups of radial magnetic conduction bridges; 501, 502 and 503 denote 3 adjacent circumferential magnetic conduction bridges; 601, 602 and 603 denote 3 adjacent magnetic collecting shoes; 7 denotes a radial working air gap; 8 denotes a magnetic conduction block of a radial magnetic field closed main loop; 901 denotes a radial magnetic field closed main loop of the stator permanent magnet 201; 902 denotes a radial magnetic field closed main loop of the stator permanent magnet 202; 10 denotes a magnetic conduction block of an axial magnetic field closed main loop; 11 denotes an axial working air gap; 903 denotes an axial magnetic field closed main loop of the stator permanent magnet 201; 904 denotes an axial magnetic field closed main loop of the stator permanent magnet 202; 12 denotes a permanent magnet bias type magnetic suspension bearing I; 13 denotes a permanent magnet bias type magnetic suspension bearing II; 14 denotes a motor rotor; 15 denotes a motor rotating shaft; 12a denotes a permanent magnet bias type axial magnetic suspension bearing; 16 denotes an axial magnetic suspension bearing rotor; 16a denotes a front subsection; 16b denotes a thrust disc, 16c denotes a rear subsection; 17 denotes a connecting and fastening section; 17a denotes a base section; 17b denotes an inter-shoe section; 17c denotes an inter-bridge section; 18 denotes an axial coil; 18a denotes a front coil; 18b denotes a rear coil; 19 denotes an axial magnetic pole; 19a denotes a front magnetic pole; 19b denotes a rear magnetic pole; 12b denotes a permanent magnet bias type radial magnetic suspension bearing; 20 denotes a radial magnetic suspension bearing rotor; 21 denotes a radial coil; 22 denotes a radial magnetic pole; 23 denotes an outer fastening plate; 24 denotes a magnetic conduction column; 26 denotes a magnetic collecting block; 27 denotes an intermediate fastening plate; 28 denotes a connecting section between magnetic collecting blocks; 29 denotes a magnetic conduction column fastening plate; 30 denotes a magnetic field loop magnetic conduction block; 31 denotes a connecting section between large-span magnetic collecting blocks; and 32 denotes a large-span magnetic collecting block.

DETAILED DESCRIPTION

The technical solutions of the present invention are described below with reference to the accompanying drawings.

In order to facilitate the detailed description of the present invention, without loss of generality, an x-y-z reference coordinate system is established. An x-y plane is parallel to an end face of a cylindrical motor (that is, a bottom face of a cylinder). r represents a radial direction of each end face of the motor (hereinafter referred to as "radial direction"). Each end face circle is in a circumferential direction (hereinafter referred to as "circumferential direction"). z represents an axial direction of the motor (hereinafter referred to as "axial direction"). Furthermore, the side of a component facing the edge of the end face circle in the radial direction is defined as a "radial outer side". The side of the component facing the center of the end face circle in the radial direction is defined as a "radial inner side". The side of the component in a positive axial direction is defined as an "axial front side". The side of the component in a negative axial direction is defined as an "axial rear side".

Figure 2:
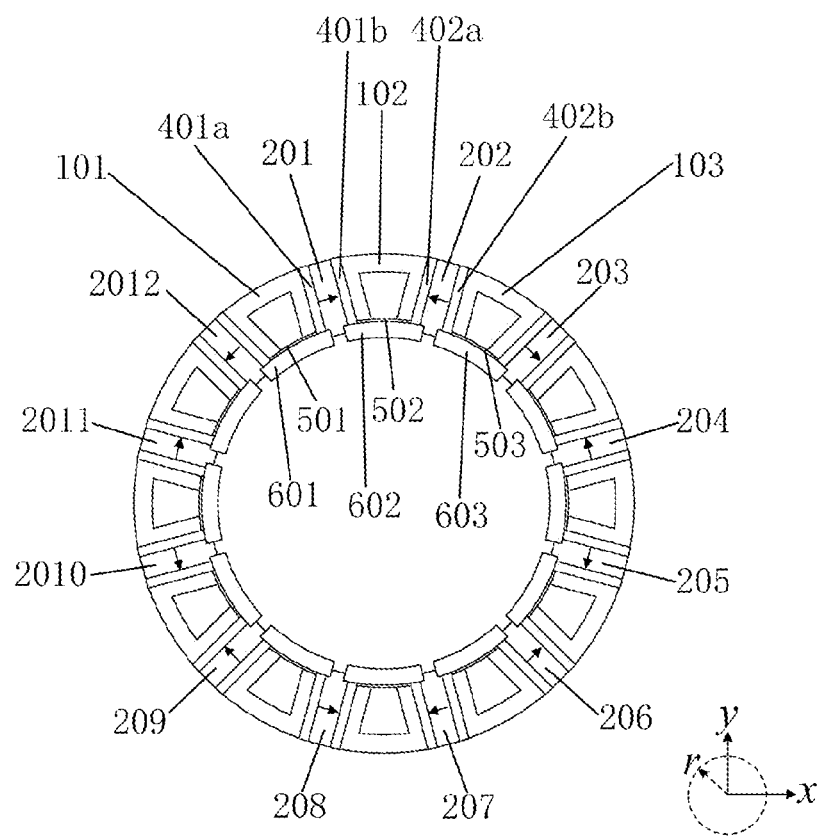
FIG. 2 is a schematic view showing numbers of stator cores and permanent magnets in the stator permanent magnet motor with magnetic pole bypasses and numbers of components in the magnetic pole bypasses in the present invention.

As shown in FIG. 1, a stator of a stator permanent magnet motor with magnetic pole bypasses in the present invention includes: modular stator cores 1, stator permanent magnets 2, a stator winding coil end 3, radial magnetic conduction bridges 4, circumferential magnetic conduction bridges 5 and magnetic collecting shoes 6. The modular stator cores 1 are formed by laminating silicon steel sheets and are evenly arranged in the circumferential direction of a motor after laminating. A stator permanent magnet 2 is embedded between two adjacent modular stator cores 1. The stator permanent magnets 2 are made of permanent magnet materials and are evenly arranged in the circumferential direction of the motor. The permanent magnet material is ferrite or samarium cobalt or neodymium iron boron or a combination of three permanent magnet materials. The magnetization directions of two adjacent stator permanent magnets 2 are opposite. As shown in FIG. 2, the magnetization directions of a stator permanent magnet 201, a stator permanent magnet 203, a stator permanent magnet 205, a stator permanent magnet 207, a stator permanent magnet 209 and a stator permanent magnet 2011 are the same. The magnetization directions of a stator permanent magnet 202, a stator permanent magnet 204, a stator permanent magnet 206, a stator permanent magnet 208, a stator permanent magnet 2010 and a stator permanent magnet 2012 are the same. The number of the modular stator cores 1 is equal to the number of the stator permanent magnets 2, and is an integer multiple of 2. The axial length of the stator permanent magnet 2 is greater than the axial length of the modular stator core 1. According to the relative positions of the stator permanent magnet 2 and the modular stator core 1, the stator permanent magnet 2 may be divided into three sections, that is, a permanent magnet section 2a extending out of the core, a permanent magnet section 2c extending out of the core, and a permanent magnet section 2b located in the core. The lengths of the permanent magnet section 2a extending out of the core and the permanent magnet section 2c extending out of the core may be calculated and determined according to the axial length of the stator winding coil end 3, the required magnetic field strength and the magnetic circuit of the motor.

The stator shown in FIG. 1 is divided into three sections, that is, a magnetic pole bypass section S1, a motor stator section S2 and a magnetic pole bypass section S3 in an axial direction. The motor stator section S2 consists of the modular stator cores 1 arranged at intervals in a circumferential direction and the permanent magnet sections 2b located in the cores. The magnetic pole bypass section S1 consists of radial magnetic conduction bridges 4, circumferential magnetic conduction bridges 5 and magnetic collecting shoes 6. The magnetic field energy of the permanent magnet section 2a extending out of the core is used for the suspension control of the permanent magnet bearing. The magnetic pole bypass section S3 consists of radial magnetic conduction bridges 4, circumferential magnetic conduction bridges 5 and magnetic collecting shoes 6. The magnetic field energy of the permanent magnet section 2c extending out of the core is used for the suspension control of the permanent magnet bearing. Each of the modular stator cores 1 is wound with a coil. The coil wound on each of the modular stator cores passes through a motor slot to form the stator winding coil end 3. The stator winding coil end 3 is electrically insulated from the magnetic collecting shoe 6.

The magnetic pole bypass section S1 and the magnetic pole bypass section S3 are shown in FIG. 1. The radial magnetic conduction bridges 4 are centered on the center of circle of the motor, and are arranged radially in the circumferential direction of the motor in a prismatic structure. Two radial magnetic conduction bridges 4 form a group. The permanent magnet section 2a extending out of the core (or the permanent magnet section 2c extending out of the core) is sandwiched between the two radial magnetic conduction bridges. As shown in FIG. 2, a radial magnetic conduction bridge 401a and a radial magnetic conduction bridge 401b are respectively arranged on two sides of the stator permanent magnet 201 to form a "sandwich" structure. Therefore, the number of the radial magnetic conduction bridges 4 is an even number. The maximum number is equal to twice the number of the stator permanent magnets 2. The minimum number is equal to 2.

The radial height of the radial magnetic conduction bridge 4 is less than or equal to the radial height of the modular stator core 1. The radial outer side of the radial magnetic conduction bridge is generally flush with the radial outer side of the modular stator core 1. The radial inner side of the radial magnetic conduction bridge avoids being lower than the radial inner side of the modular stator core 1. The circumferential width of the radial magnetic conduction bridge is generally half of the width of a middle part 1a of a stator tooth of the modular stator core 1. As shown in FIG. 1, the axial length may be equal to or greater than or less than the axial length of the permanent magnet section 2a extending out of the core (or the permanent magnet section 2c extending out of the core). When the axial length of the radial magnetic conduction bridge is selected to be less than the axial length of the permanent magnet section extending out of the core, a part of the magnetic field energy of the permanent magnet section extending out of the core will be wasted. When the axial length of the radial magnetic conduction bridge is selected to be equal to the axial length of the permanent magnet section extending out of the core, the use ratio of the magnetic field energy of the permanent magnet section extending out of the core is the highest, and the material cost of the radial magnetic conduction bridge 4 is the lowest. When the axial length of the radial magnetic conduction bridge is selected to be greater than the axial length of the permanent magnet section extending out of the core, the length of the stator winding coil end 3 may be affected. Preferably, the axial length of the radial magnetic conduction bridge is selected to be equal to the axial length of the permanent magnet section extending out of the core.

As shown in FIG. 1, the circumferential magnetic conduction bridge 5 is arc-shaped. The number of the circumferential magnetic conduction bridges is equal to half of the number of the radial magnetic conduction bridges 4. The axial thickness of the circumferential magnetic conduction bridge may be equal to the radial height of the circumferential magnetic conduction bridge. The circumferential length of the circumferential magnetic conduction bridge is determined according to the size of the radial magnetic conduction bridge 4. One circumferential magnetic conduction bridge 5 and two radial magnetic conduction bridges 4 form a "U-shape" structure. The radial inner side of the "U-shaped" structure avoids being lower than the radial inner side of the modular stator core 1. The radial magnetic conduction bridge 4 is in reliable contact with and fits to the permanent magnet section 2a extending out of the core (or the permanent magnet section 2c extending out of the core). The axial rear side of each "U-shaped" structure is bonded with an arc-shaped magnetic collecting shoe 6. The "U-shaped" structures bonded with the magnetic collecting shoes 6 are evenly distributed in an axial direction to form the magnetic pole bypass section S1. The distance between a group of radial magnetic conduction bridges 4 is w2 (radian). The distance between two adjacent magnetic collecting shoes 6 is w1 (radian). Too small w1 will lead to an increase in the magnetic flux leakage between two adjacent magnetic collecting shoes 6. Too large w1 will lead to a decrease in the magnetic collecting area of the magnetic collecting shoes 6. Therefore, there are generally two selection schemes for the size relationship between w1 and w2: (1) w1≥w2; (2) 0.5×w2≤w1<w2. The scheme (2) is preferred. The structure of the magnetic pole bypass section S3 is similar to that of the magnetic pole bypass section S1, and the difference is only that the axial front side of each "U-shaped" structure in the magnetic pole bypass section S3 is bonded with a magnetic collecting shoe 6. The magnetic collecting shoes 6 evenly arranged in a circumferential direction are in reliable contact with and fit to the radial magnetic conduction bridges 4 and the circumferential magnetic conduction bridges 5. The number of the magnetic collecting shoes is equal to the number of the circumferential magnetic conduction bridges 5. The axial length and radial thickness of the magnetic collecting shoe 6 are calculated according to the required magnetic field strength and the magnetic circuit of the motor. The radial magnetic conduction bridge 4, the circumferential magnetic conduction bridge 5 and the magnetic collecting shoe 6 may be independent components respectively or may be an integral component, and are all made of materials with good magnetic conductivity, such as silicon steel sheets.

Figure 3A:
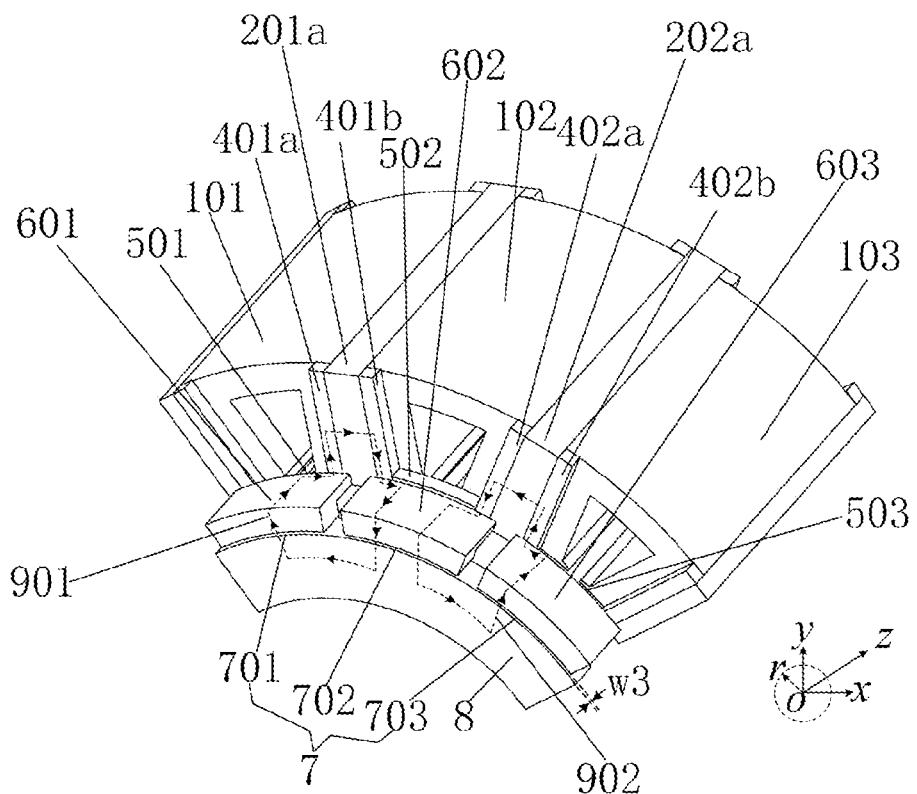
FIG. 3A is a schematic view of a typical magnetic field closed main loop I of the magnetic pole bypass in the present invention.
Figure 3B:
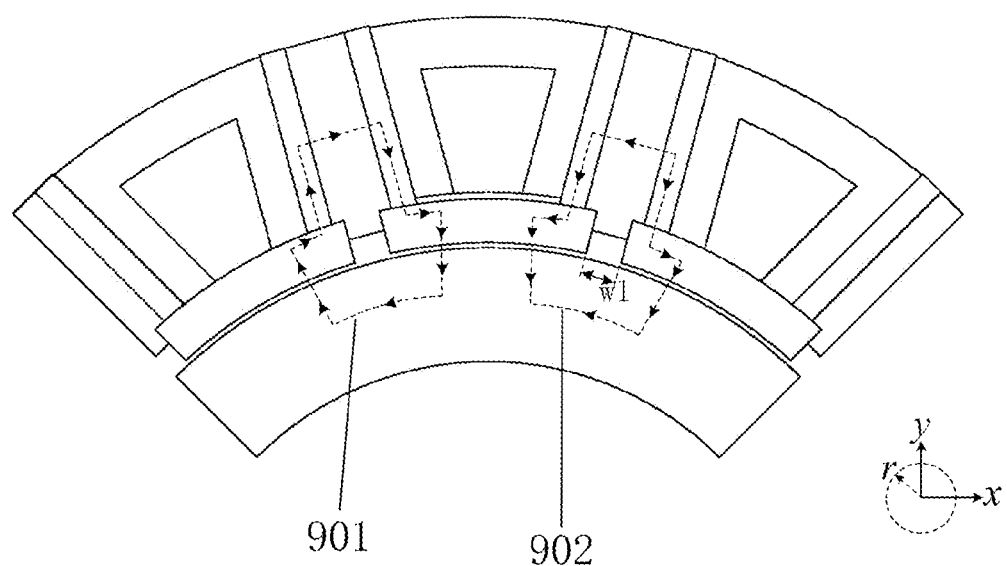
FIG. 3B is a radial view of FIG. 3A.

In order to facilitate the description of the typical magnetic field closed main loop I of the magnetic pole bypass of the present invention, 3 adjacent modular stator cores (a modular stator core 101, a modular stator core 102 and a modular stator core 103), 2 adjacent groups of adjacent radial magnetic conduction bridges (radial magnetic conduction bridges 401*a* and 401*b* and radial magnetic conduction bridges 402*a* and 402*b*), 3 adjacent circumferential magnetic conduction bridges (a circumferential magnetic conduction bridge 501, a circumferential magnetic conduction bridge 502 and a circumferential magnetic conduction bridge 503), 2 adjacent permanent magnet sections extending out of the core (a permanent magnet section 201*a* extending out of the core and a permanent magnet section 202*a* extending out of the core), 3 adjacent magnetic collecting shoes (a magnetic collecting shoe 601, a magnetic collecting shoe 602 and a magnetic collecting shoe 603), and a magnetic conduction block 8 of a radial magnetic field closed main loop in FIG. 3A are selected as analysis objects. The magnetic conduction block 8 of the radial magnetic field closed main loop is located on the radial inner side of the magnetic collecting shoe 6, and a radial working air gap 701, a radial working air gap 702 and a radial working air gap 703 are formed therebetween. The length of the radial working air gap is w3. The w3 is calculated according to the required air gap magnetic field strength and a magnetic circuit equation in the magnetic pole bypass. According to the principle of minimum magnetic resistance, when the length w3 of the radial working air gap is much less than the distance w1 between two adjacent magnetic collecting shoes 6, a radial magnetic field closed main loop 901 of the permanent magnet section 201*a* extending out of the core is: the radial magnetic conduction bridge 401*b*, the circumferential magnetic conduction bridge 502, the magnetic collecting shoe 602, the radial working air gap 702, the magnetic conduction block 8 of the radial magnetic field closed main loop, the radial working air gap 701, the magnetic collecting shoe 601, the circumferential magnetic conduction bridge 501, and the radial magnetic conduction bridge 401*a*. By a similar analysis idea, radial magnetic field closed main loops of other permanent magnet sections extending out of the core may be analyzed. A radial magnetic field closed main loop 902 of the permanent magnet section 202*a* extending out of the core is shown in FIG. 3A. The number of the radial magnetic field closed main loops is equal to the number of the magnetic collecting shoes. A radial view of the typical magnetic field closed loop I of the magnetic pole bypass shown in FIG. 3A is shown in FIG. 3B.

Figure 4A:
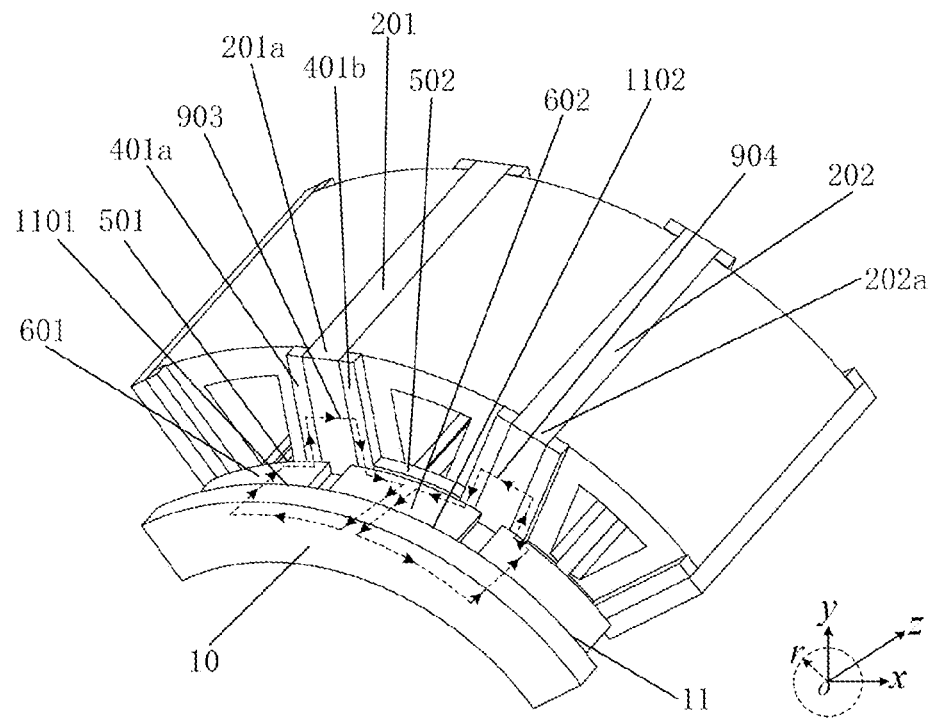
FIG. 4A is a schematic view of a typical magnetic field closed main loop II of the magnetic pole bypass in the present invention.
Figure 4B:
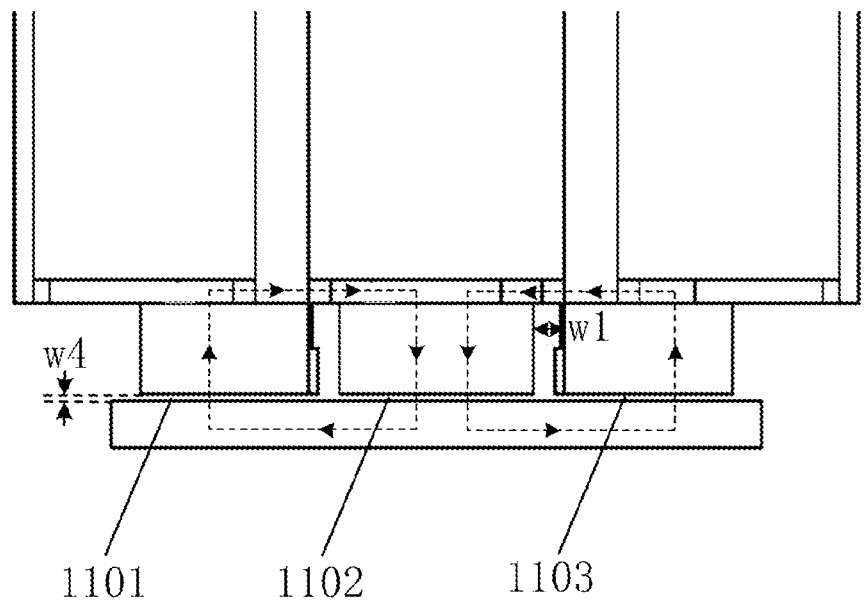
FIG. 4B is an axial view of FIG. 4A.

A typical magnetic field closed main loop II of the magnetic pole bypass is further analyzed. The magnetic conduction block 8 of the radial magnetic field closed main loop in FIG. 3A is replaced with a magnetic conduction block 10 of an axial magnetic field closed main loop in FIG. 4A. The magnetic conduction block 10 of the axial magnetic field closed main loop is located on the axial rear side of the magnetic collecting shoe, and an axial working air gap 11 (an axial working air gap 1101, an axial working air gap 1102 and an axial working air gap 1103 in FIG. 4B) is formed between the two. The length of the axial working air gap is w4, and the w4 is calculated according to the required air gap magnetic field strength and a magnetic circuit equation in the magnetic pole bypass. According to the principle of minimum magnetic resistance, when the length w4 of the axial working air gap is much less than the distance w1 between two adjacent magnetic collecting shoes 6, an axial magnetic field closed main loop 903 of the permanent magnet section 201*a* extending out of the core is: the radial magnetic conduction bridge 401*b*, the circumferential magnetic conduction bridge 502, the magnetic collecting shoe 602, the axial working air gap 1102, the magnetic conduction block 10 of the axial magnetic field closed main loop, the axial working air gap 1101, the magnetic collecting shoe 601, the circumferential magnetic conduction bridge 501, and the radial magnetic conduction bridge 401*a*. By a similar analysis idea, axial magnetic field closed main loops of other permanent magnet sections extending out of the core may be analyzed. An axial magnetic field closed main loop 904 of the permanent magnet section 202*a* extending out of the core is shown in FIG. 4A. The number of the axial magnetic field closed main loops is equal to the number of the magnetic collecting shoes. An axial view of the typical magnetic field closed loop II of the magnetic pole bypass shown in FIG. 4A is shown in FIG. 4B.

Based on the above analysis, the radial/axial magnetic field closed main loop is the typical magnetic field closed main loop I/II of the magnetic pole bypass in the present invention. It can be known from the public technology of the permanent magnet bias type magnetic suspension bearing in the art that based on the typical magnetic field closed main loop I/II of the magnetic pole bypass, a permanent magnet bias type radial/axial magnetic suspension bearing may be designed, and the number of poles of the permanent magnet bias type radial/axial magnetic suspension bearing is equal to the number of the magnetic collecting shoes. The strength of the bias magnetic field is determined by the magnetic circuit structure of the magnetic pole bypass. The typical magnetic field closed main loop of the magnetic pole bypass includes: permanent magnet sections 2*a* extending out of the cores (or permanent magnet sections 2*c* extending out of the cores), radial magnetic conduction bridges 4, circumferential magnetic conduction bridges 5, magnetic collecting shoes 6, radial working air gaps 7 (axial working air gaps 11 for the axial magnetic suspension bearing), and magnetic conduction blocks 8 of the radial magnetic field closed main loop (magnetic conduction blocks 10 of the axial magnetic field closed main loop for the axial magnetic suspension bearing).

Figure 5:
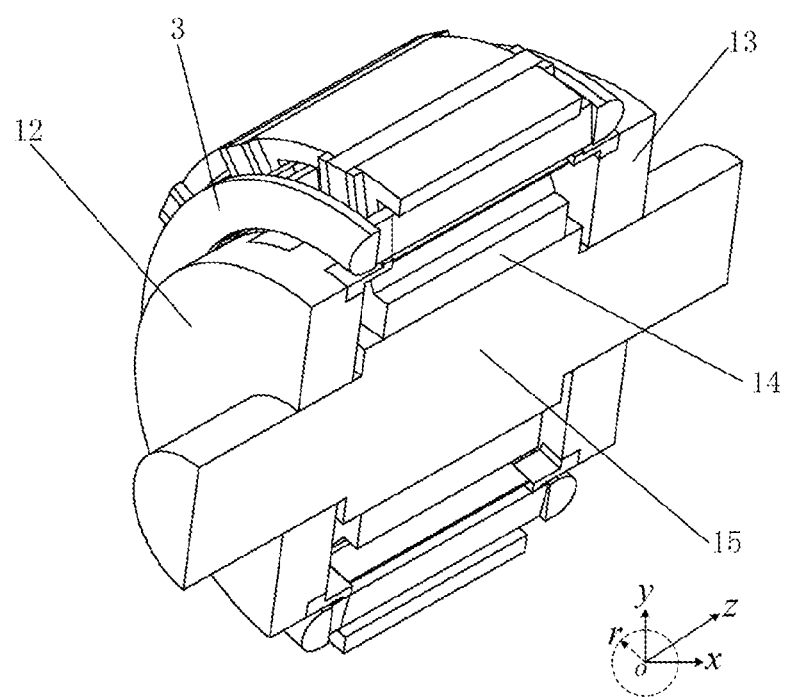
FIG. 5 is a ½ cross-sectional view of a magnetic suspension bearing motor system with magnetic pole bypasses in the present invention.

Specific Embodiment I: 12-Pole Permanent Magnet Bias Type Axial Magnetic Suspension Bearing Motor with Magnetic Pole Bypasses FIG. 5 shows a 12-pole permanent magnet bias type axial magnetic suspension bearing motor system with magnetic pole bypasses in the present invention, including a permanent magnet bias type magnetic suspension bearing I 12, a permanent magnet bias type magnetic suspension bearing II 13, a motor rotor 14 and a motor rotating shaft 15. The motor rotor 14 is sleeved over the motor rotating shaft 15 and is in interference fit with the motor rotating shaft. The stator of the circumferential structure shown in FIG. 1 is sleeved over the outer side of the motor rotor 14. The permanent magnet bias type magnetic suspension bearing 112 is assembled on the axial rear side of the motor rotating shaft 15 and is in reliable contact with and fits to the permanent magnet section of the stator extending out of the core through the magnetic pole bypass section S1. The permanent magnet bias type magnetic suspension bearing II 13 is assembled on the axial front side of the motor rotating shaft 15 and is in reliable contact with and fits to the permanent magnet section of the stator extending out of the core through the magnetic pole bypass section S3. A safe electrical insulation distance is kept between the permanent magnet bias magnetic fields of the permanent magnet bias type magnetic suspension bearing I 12 and the permanent magnet bias type magnetic suspension bearing II 13 and the stator winding coil end 3, so as to achieve mutual isolation. The permanent magnet bias magnetic fields of both the permanent magnet bias type magnetic suspension bearing I 12 and the permanent magnet bias type magnetic suspension bearing II 13 are derived from the permanent magnet section 2a extending out of the core (or the permanent magnet section 2c extending out of the core), and the type may be one or more of a permanent magnet bias type axial magnetic suspension bearing, a permanent magnet bias type radial magnetic suspension bearing, and a permanent magnet bias type radial and axial hybrid magnetic suspension bearing.

Figure 6A:
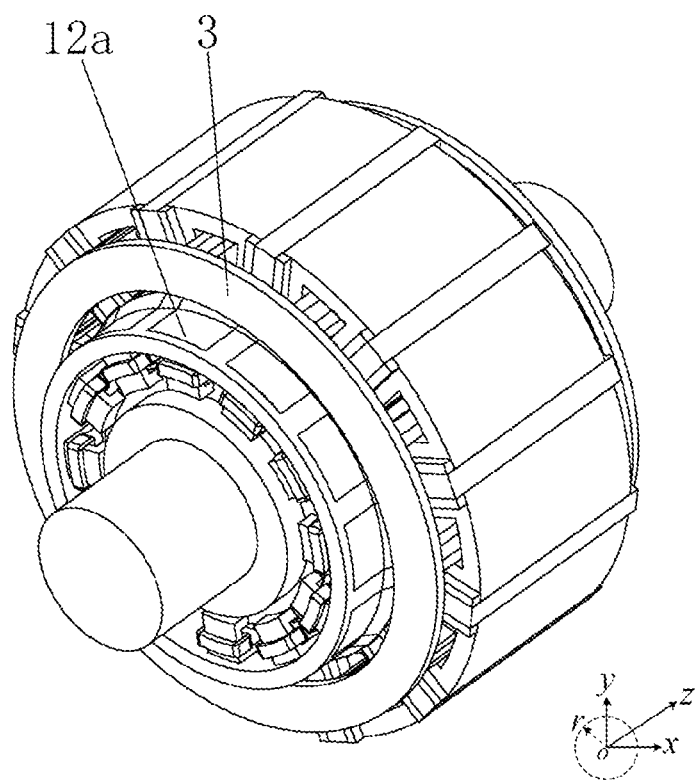
FIG. 6A is a schematic structural view of a 12-pole permanent magnet bias type axial magnetic suspension bearing motor in a specific embodiment I of the present invention.
Figure 6B:
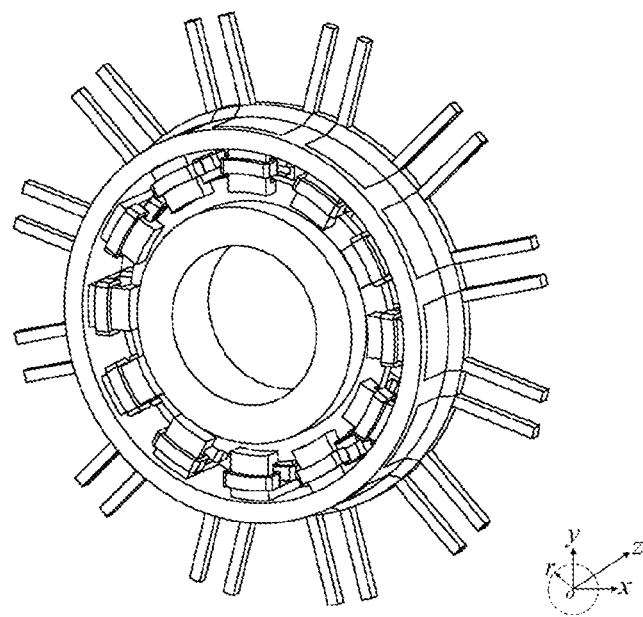
FIG. 6B is a schematic structural view of a 12-pole permanent magnet bias type axial magnetic suspension bearing.
Figure 6C:
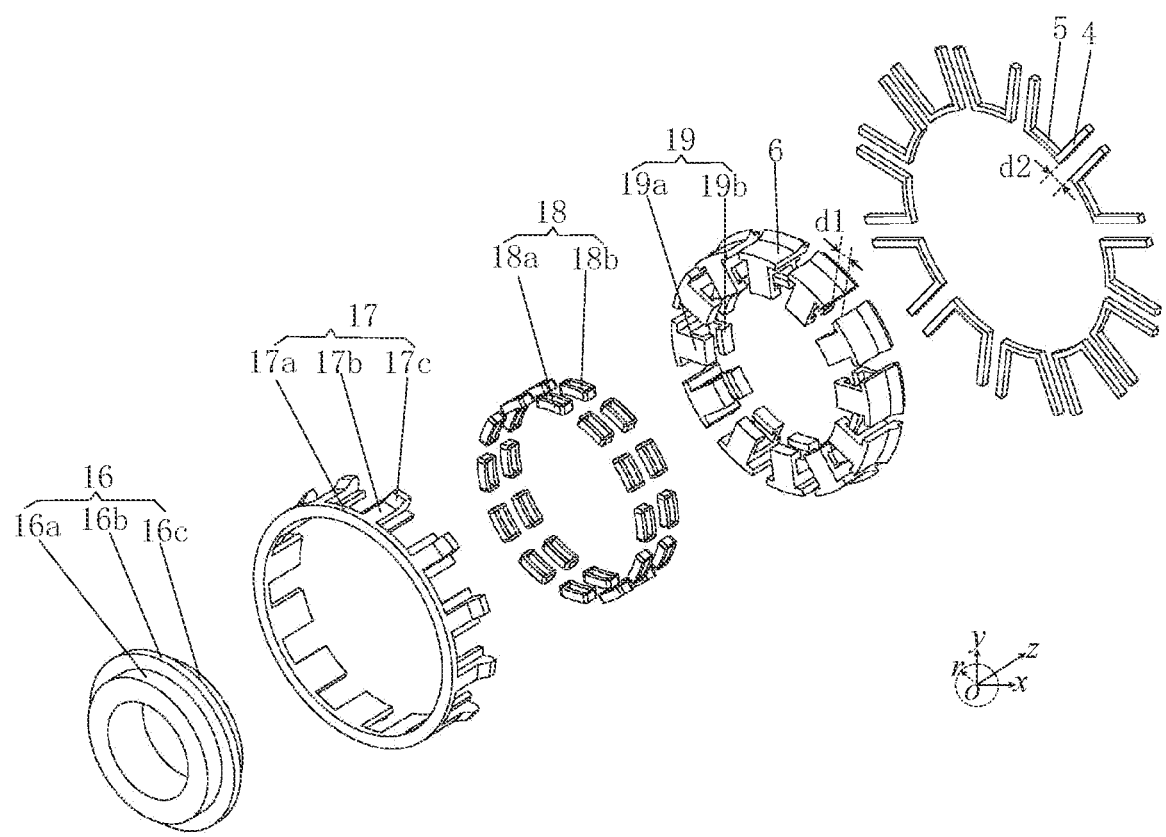
FIG. 6C is a structural exploded view of the 12-pole permanent magnet bias type axial magnetic suspension bearing.

As shown in FIG. 6A, FIG. 6B and FIG. 6C, a permanent magnet bias type axial magnetic suspension bearing 12a is located on the radial inner side of the stator winding coil end 3, and includes an axial magnetic suspension bearing rotor 16, a connecting and fastening section 17 and axial coils 18. The number of magnetic poles of the permanent magnet bias type axial magnetic suspension bearing 12a is 12. The coupling degree of two adjacent magnetic poles is low, and the fault-tolerant ability is higher.

As shown in FIG. 6C, the axial magnetic suspension bearing rotor 16 is of a three-subsection structure, including a front subsection 16a, a thrust disc 16b and a rear subsection 16c, so as to ensure that the thrust disc 16b has reliable mechanical strength. The three subsections may be independent components respectively or may be an integral component, and are usually made of materials with good magnetic conductivity, such as silicon steel sheets. The axial magnetic suspension bearing rotor 16 is of an axial hollow structure. The motor rotating shaft 15 may penetrate into an inner ring of the axial magnetic suspension bearing rotor. The fastening and reliable contact between the axial magnetic suspension bearing rotor 16 and the motor rotating shaft 15 may be achieved by means of interference fit, a key slot, etc., so as to ensure the synchronous rotation of the motor rotating shaft 15 and the axial magnetic suspension bearing rotor 16, and avoid relative displacement and movement in axial and radial directions.

As shown in FIG. 6C, the connecting and fastening section 17 is made of non-magnetic-conduction and low-conductivity materials with certain mechanical strength and hardness, such as ceramics, stainless steel and high-temperature resistance plastics. The connecting and fastening section includes a base section 17a, inter-shoe sections 17b and inter-bridge sections 17c. The base section 17a is of a ring structure, the inter-shoe section 17b is embedded between two adjacent magnetic collecting shoes 6 and two adjacent axial magnetic poles 19. The inter-bridge section 17c is embedded between the radial magnetic conduction bridges 4 on two sides of the same stator permanent magnet and is in contact with the end face of the stator permanent magnet at the same time. Therefore, the connecting and fastening section 17 plays a role in connecting and fastening all components of the axial magnetic suspension bearing rotor 16 to form a whole.

Each of the axial magnetic poles 19 includes a front magnetic pole 19a and a rear magnetic pole 19b. The front magnetic pole 19a and the rear magnetic pole 19b present an "opposite L" structure. The front magnetic pole 19a and the rear magnetic pole 19b are respectively wound with a front coil 18a and a rear coil 18b in a concentrated manner. The radial outer ends of the front and rear magnetic poles of the "opposite L" structure are bonded with or integrally formed with the arc-shaped magnetic collecting shoes 6. The axial magnetic poles which reliably fit to the magnetic collecting shoes are evenly distributed in a circumferential direction with a distance d1 (radian). The distance between the radial magnetic conduction bridges on two sides of the stator permanent magnet is d2 (radian). There are two selection schemes for the size relationship between d1 and d2: (1) if d1>d2, the magnetic flux generated when the axial coil 18 is energized passes through the stator permanent magnet; and (2) if $0.5 \times d2 \le d1 < d2$, the magnetic flux generated when the axial coil 18 is energized does not pass through the stator permanent magnet, but passes through the inter-shoe connecting section 17b between two adjacent magnetic collecting shoes 6.

Further, when the thickness of the stator permanent magnet is smaller, that is, the d2 is smaller, the scheme (1) selected may reduce the current in the axial coil 18, but the stator permanent magnet has the risk of irreversible demagnetization. When the thickness of the stator permanent magnet is larger, that is, the d2 is larger, the scheme (1) selected will lead to a larger current in the axial coil 18, which is not conducive to reducing losses and system costs, so the scheme (2) is generally preferred.

As shown in FIG. 6C, the assembly process of the axial magnetic suspension bearing is as follows. The axial magnetic suspension bearing rotor 16 is assembled on the motor rotating shaft 15 by means of interference fit or a key slot. The axial magnetic pole 19 of the "opposite L" structure is assembled between two adjacent inter-shoe sections 17b. The thrust disc 16b is arranged in the gap of the axial magnetic pole 19 of the "opposite L" structure. The front magnetic pole 19a and the rear magnetic pole 19b are respectively wound with a front coil 18a and a rear coil 18b in a concentrated manner. The "U-shaped" structure formed by the radial magnetic conduction bridges 4 and the circumferential magnetic conduction bridge 5 is assembled between two adjacent inter-bridge sections 17c.

By analyzing the structure of the permanent magnet bias type axial magnetic suspension bearing 12a and the size relationship between d1 and d2, it can be learned that the stator permanent magnet may provide a bias magnetic field. When the axial coil 18 is not supplied with a current, the thrust disc 16b may be in a certain balance position between the front magnetic pole 19a and the rear magnetic pole 19b. At this time, the axial resultant force of the thrust disc 16b is zero. When the axial magnetic suspension bearing rotor 16 deviates from the balance position and approaches the front magnetic pole 19a (or the rear magnetic pole 19b), it is only necessary to supply an appropriate current into the axial coil 18. The magnetic flux generated by the current may make the axial magnetic suspension bearing rotor 16 in a new balance position.

Figure 7A:
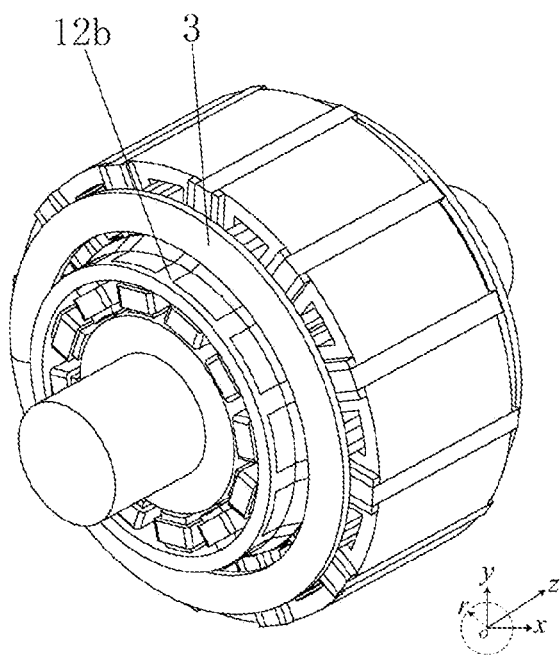
FIG. 7A is a schematic structural view of a 12-pole permanent magnet bias type radial magnetic suspension bearing motor in a specific embodiment II of the present invention.
Figure 7B:
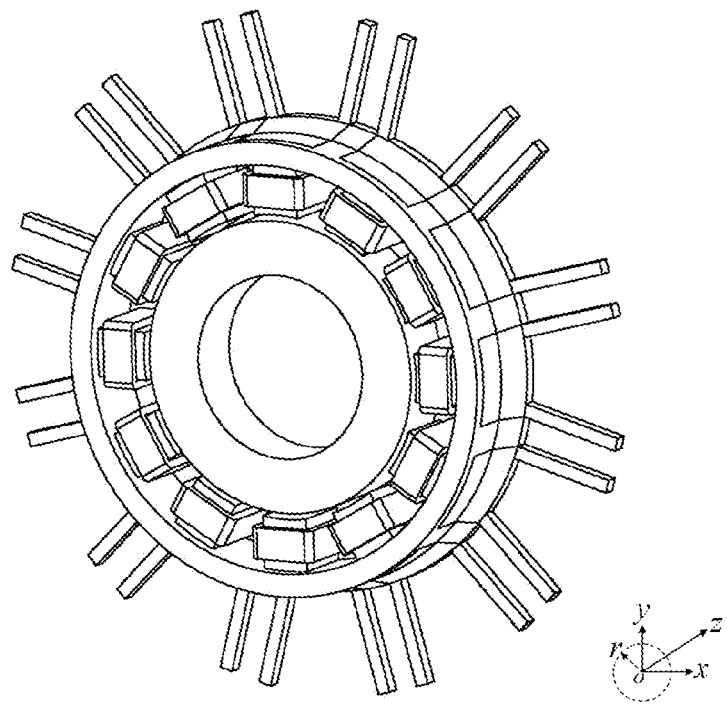
FIG. 7B is a schematic structural view of a 12-pole permanent magnet bias type radial magnetic suspension bearing.
Figure 7C:
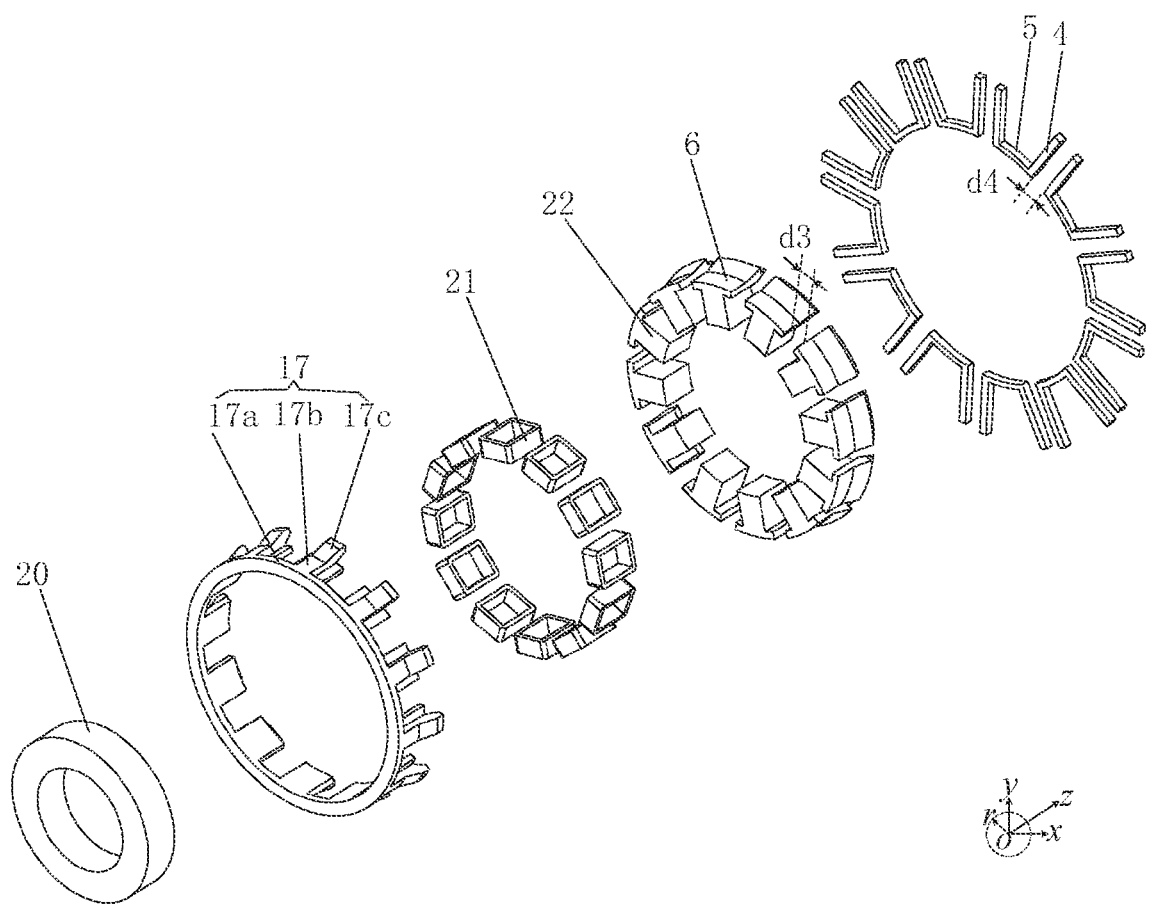
FIG. 7C is a schematic structural exploded view of the 12-pole permanent magnet bias type radial magnetic suspension bearing.

Specific Embodiment II: 12-Pole Permanent Magnet Bias Type Radial Magnetic Suspension Bearing Motor with Magnetic Pole Bypasses As shown in FIG. 7A, FIG. 7B and FIG. 7C, the permanent magnet bias type radial magnetic suspension bearing 12b is located on the inner side of the stator winding coil end 3. As shown in FIG. 7B, the permanent magnet bias type radial magnetic suspension bearing 12b includes a radial magnetic suspension bearing rotor 20, a connecting and fastening section 17, radial coils 21 and radial magnetic poles 22. The number of magnetic poles of the permanent magnet bias type radial magnetic suspension bearing 12b is 12, and the fault-tolerant ability is higher.

The radial magnetic suspension bearing rotor 20 is of an axial hollow structure and is usually made of materials with good magnetic conductivity, such as silicon steel sheets. The motor rotating shaft 15 may penetrate into an inner ring of the radial magnetic suspension bearing rotor. The fastening and reliable contact between the radial magnetic suspension bearing rotor 20 and the motor rotating shaft 15 may be achieved by means of interference fit, a key slot, etc., so as to ensure the synchronous rotation of the motor rotating shaft 15 and the radial magnetic suspension bearing rotor 20, and avoid relative displacement and movement in axial and radial directions. The connecting and fastening section 17 of the permanent magnet bias type radial magnetic suspension bearing 12b is similar to that of the permanent magnet bias type axial magnetic suspension bearing 12a in structure, so as to play a role in connecting and fastening all components to form a whole. The radial magnetic pole 22 is of a T-shaped structure with a radial outer end connected to the magnetic collecting shoe 6. The T-shaped structures are evenly distributed in a circumferential direction with a distance d3 (radian). Each of the T-shaped structures is wound with a radial coil 21. The distance between the radial magnetic conduction bridges on two sides of the stator permanent magnet is d4 (radian). There are two selection schemes for the size relationship between d3 and d4: (1) if d3>d4, the magnetic flux generated when the radial coil 21 is energized passes through the stator permanent magnet; and (2) if 0.5×d4≤d3<d4, the magnetic flux generated when the radial coil 21 is energized does not pass through the stator permanent magnet, but passes through the inter-shoe section 17b between two adjacent magnetic collecting shoes 6.

Further, when the thickness of the stator permanent magnet is smaller, that is, the d4 is smaller, the scheme (1) selected may reduce the current in the radial coil 21, but the stator permanent magnet has the risk of irreversible demagnetization. When the thickness of the stator permanent magnet is larger, that is, the d4 is larger, the scheme (1) selected will lead to a larger current in the radial coil 21, which is not conducive to reducing losses and system costs, so the scheme (2) is generally preferred.

By analyzing the structure of the permanent magnet bias type radial magnetic suspension bearing 12b and the size relationship between d3 and d4, it can be learned that the stator permanent magnet may provide a bias magnetic field. When the radial magnetic suspension bearing rotor 20 deviates from the balance position due to disturbance, it is only necessary to supply an appropriate current into the radial coil 21. The magnetic flux generated by the current may make the radial magnetic suspension bearing rotor 20 in a new balance position through the radial magnetic pole 22.

Figure 8A:
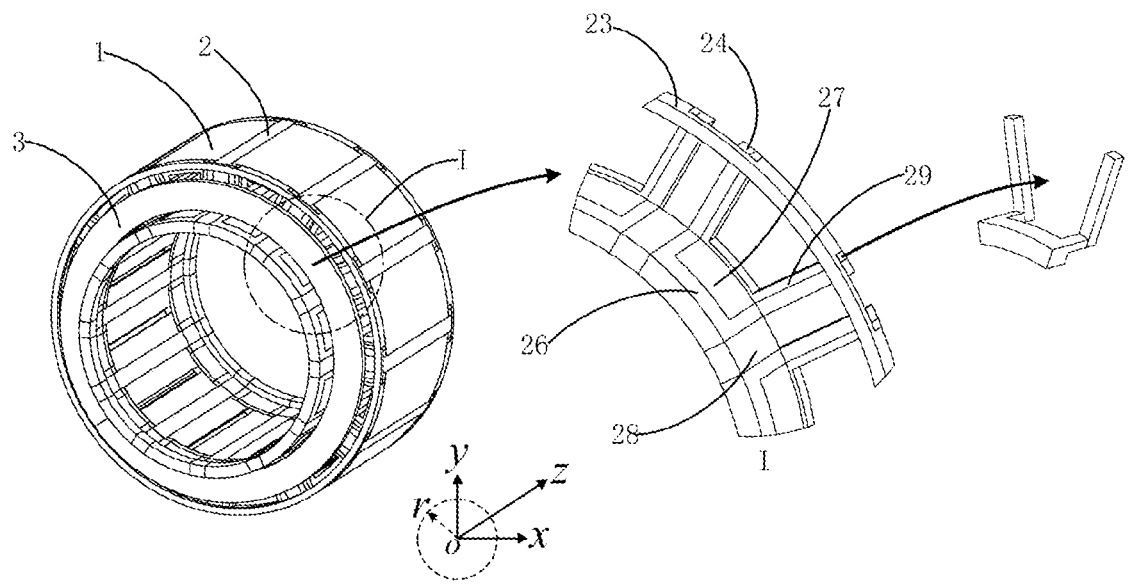
FIG. 8A is a schematic structural view of a bias magnetic circuit of a magnetic suspension bearing of a 12-pole stator permanent magnet motor in a specific embodiment III of the present invention.

Specific Embodiment III: Magnetic Suspension Bearing of 12-Pole Stator Permanent Magnet Motor with Adjustable Bias Magnetic Field As shown in FIG. 8A, a stator structure of a 12-pole stator permanent magnet motor includes a stator winding coil end 3, modular stator cores 1 and stator permanent magnets 2. A bias magnetic circuit structure of a magnetic suspension bearing includes an outer fastening plate 23, magnetic conduction columns 24, magnetic collecting blocks 26, an intermediate fastening plate 27, connecting sections 28 between magnetic collecting blocks, and magnetic conduction column fastening plates 29. The modular stator core 1 is formed by laminating silicon steel sheets, and is generally made modularly. The stator permanent magnet 2 is located between two adjacent modular stator cores 1. The modular stator cores 1, the stator permanent magnets 2 and the stator winding coil end 3 together form the stator of the stator permanent magnet motor. Viewed from an axial direction, the part of the stator winding coil extending out of the stator core 2 is defined as the stator winding coil end 3.

In the bias magnetic circuit structure of the magnetic suspension bearing of the stator permanent magnet motor with an adjustable bias magnetic field, the magnetic conduction column 24 is made of magnetic conduction materials, and includes the radial magnetic conduction bridge in close contact with the stator permanent magnet 2, and the circumferential magnetic conduction bridge extending to the magnetic collecting block 26 in an axial direction. Two radial magnetic conduction bridges in close contact with adjacent stator permanent magnets are connected to the same circumferential magnetic conduction bridge to form a "U-shaped" structure. The role of the "U-shaped" structure is the same as that in the above embodiment, that is, the "U-shaped" structure plays a role in extracting the magnetic field energy of the stator permanent magnet 2 and concentrating the magnetic field energy to the magnetic collecting block 26. The magnetic collecting block 26 is a circumferential magnetic collecting component with an embedded circumferential magnetic conduction bridge structure. The connecting sections 28 between magnetic collecting blocks are distributed between adjacent magnetic collecting blocks 26. The magnetic collecting blocks 26 and the connecting sections 28 between magnetic collecting blocks distributed at intervals in a circumferential direction form a circumferential magnetic collecting ring.

A U-shaped magnetic conduction column fastening plate 29 is radially arranged between two magnetic conduction columns 24 of the "U-shaped" structure. The U-shaped magnetic conduction column fastening plate 29 is made of non-magnetic-conduction and low-conductivity materials with certain mechanical strength and hardness, and plays a role in fastening the magnetic conduction column 24 and the stator permanent magnet 2. The intermediate fastening plate 27 is arranged on the inner sides of the magnetic conduction column 24 and the magnetic conduction column fastening plate 29. The material of the intermediate fastening plate 27 is the same as the material of the magnetic conduction column fastening plate 29. The intermediate fastening plate and the magnetic conduction column fastening plate 29 may be made respectively or may be made integrally as an integral component.

Figure 8B:
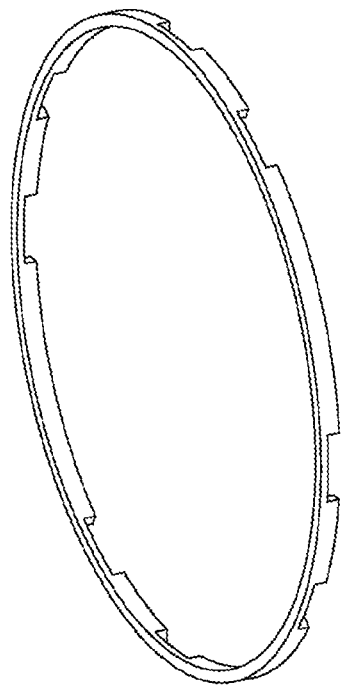
FIG. 8B is a structural view of an outer fastening plate.

The outer fastening plate 23 is arranged on the axial rear sides of the magnetic conduction column 24 and the magnetic conduction column fastening plate 29. The outer fastening plate 23 is made of non-magnetic-conduction and low-conductivity materials with certain mechanical strength and hardness. As shown in FIG. 8B, an axial end face of the outer fastening plate 23 is a smooth plane, the other end face has a concave-convex shape, the convex part is clamped in the U-shaped magnetic conduction column fastening plate 29, and the concave part clamps two adjacent U-shaped magnetic conduction column fastening plates so as to clamp the magnetic conduction column and the stator permanent magnet between the two adjacent magnetic conduction column fastening plates.

The magnetic collecting block 26 is made of magnetic conduction materials. The magnetic field energy of the stator permanent magnet 2, extracted by the magnetic conduction column 24, is concentrated to the magnetic collecting block 26, which is convenient to provide a bias magnetic circuit for the magnetic suspension bearing. The connecting section 28 between magnetic collecting blocks is arranged between two adjacent magnetic collecting blocks. According to the number of magnetic poles of the bias magnetic field and the need for adjusting the magnetic pole strength, the connecting section 28 between magnetic collecting blocks may be made of magnetic conduction materials or non-magnetic-conduction materials.

Figure 8C:
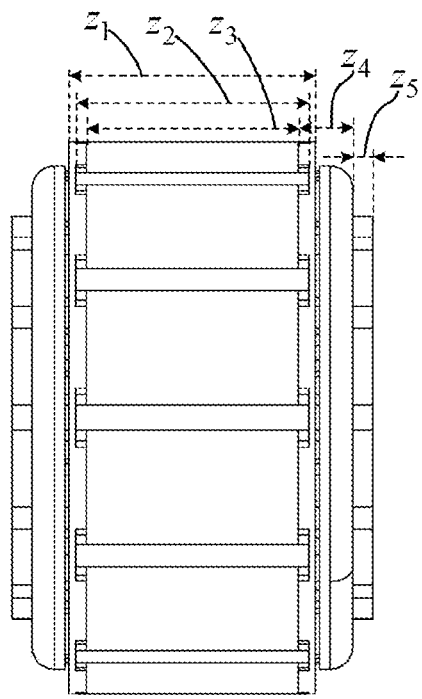
FIG. 8C is an axial view of FIG. 8A.

In FIG. 8C, an axial length z1 of the outer fastening plate>an axial length z2 of the stator permanent magnet>an axial length z3 of the stator core, a unilateral axial length z4 of the stator winding coil end>0, and an axial length z5 of the magnetic collecting block and the stator winding coil end>0. Generally, the axial length of the magnetic collecting block≤z5, so as to prevent the stator winding coil end from generating the eddy current loss on the surface of the magnetic collecting block.

Figure 8D:
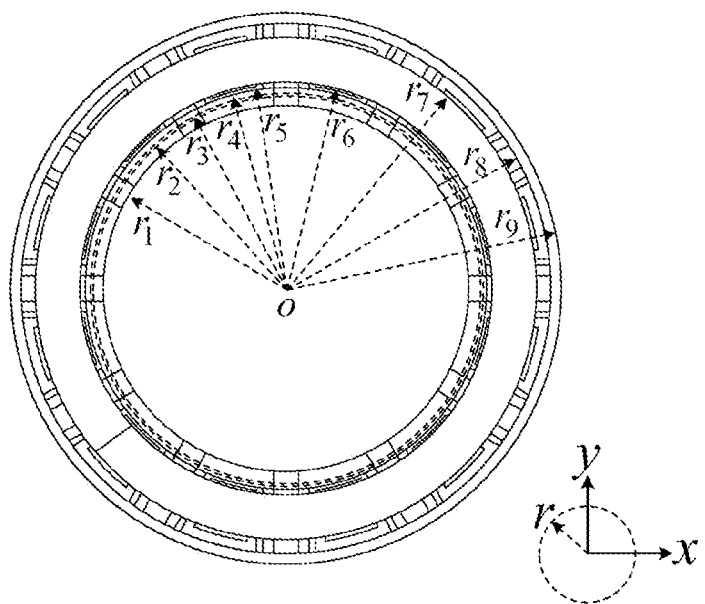
FIG. 8D is a radial view of FIG. 8A.

In FIG. 8D, an inner radius r1 of the magnetic collecting block<an inner radius r2 of the stator core<an inner radius r3 of the lower fastening section of the magnetic conduction column fastening plate<an outer radius r4 of the magnetic collecting block<an inner radius r5 of the lower fastening section of the magnetic conduction column fastening plate<an inner radius r6 of the stator winding coil end<an inner radius r7 of the stator winding coil end<an inner radius r8 of the outer fastening plate<an outer radius r9 of the stator core.

Figure 9:
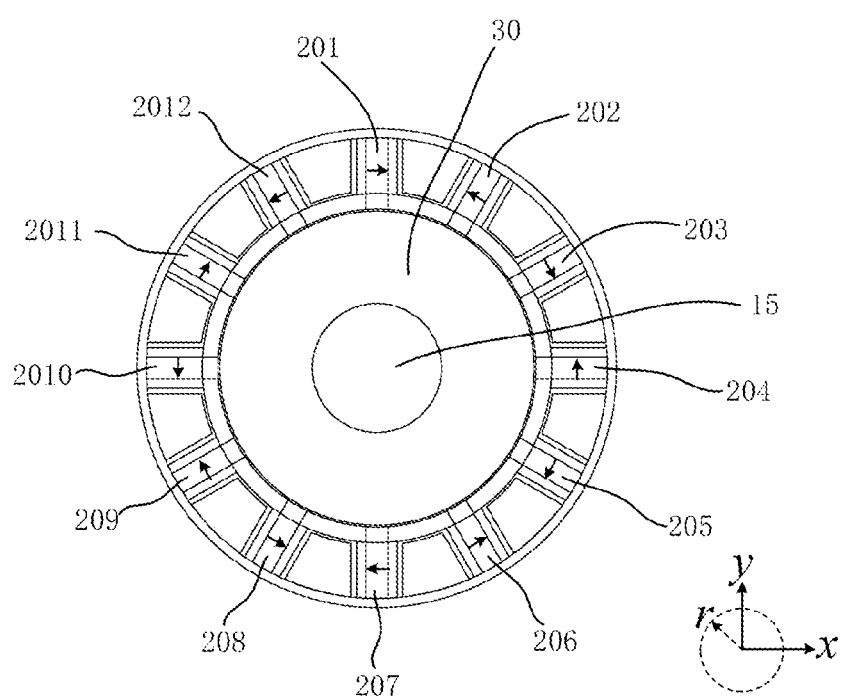
FIG. 9 is a schematic view showing magnetizing directions of a 12-pole permanent magnet of the stator permanent magnet motor in the specific embodiment III of the present invention.

FIG. 9 is a schematic view showing magnetizing directions of a 12-pole permanent magnet of the stator permanent magnet motor in this embodiment. The stator permanent magnet motor is provided with 12 stator permanent magnets, namely a stator permanent magnet 201, a stator permanent magnet 202, . . . , and a stator permanent magnet 2012, distributed in a circumferential direction. The magnetizing directions of two adjacent stator permanent magnets are opposite. That is, the magnetizing directions of the stator permanent magnet 201, the stator permanent magnet 203, the stator permanent magnet 205, the stator permanent magnet 207, the stator permanent magnet 209 and the stator permanent magnet 2011 are the same. The magnetizing directions of the stator permanent magnet 202, the stator permanent magnet 204, the stator permanent magnet 206, the stator permanent magnet 208, the stator permanent magnet 2010 and the stator permanent magnet 2012 are the same. The magnetizing direction may also be a magnetic pole direction or a magnetization direction.

Further, in order to facilitate the detailed description of the present invention, as shown in FIG. 9, without loss of generality, a magnetic field loop magnetic conduction block 30 is arranged on the radial inner side of the circumferential magnetic collecting ring formed by the magnetic collecting blocks and the connecting sections between magnetic collecting blocks. The magnetic field loop magnetic conduction block 30 is tightly connected with the motor rotating shaft 15 by means of interference fit or a key slot. Furthermore, an air gap is formed between the connecting section between magnetic collecting blocks and the magnetic field loop magnetic conduction block 30. The magnetic field loop magnetic conduction block 30 is made of magnetic conduction materials.

Figure 10A:
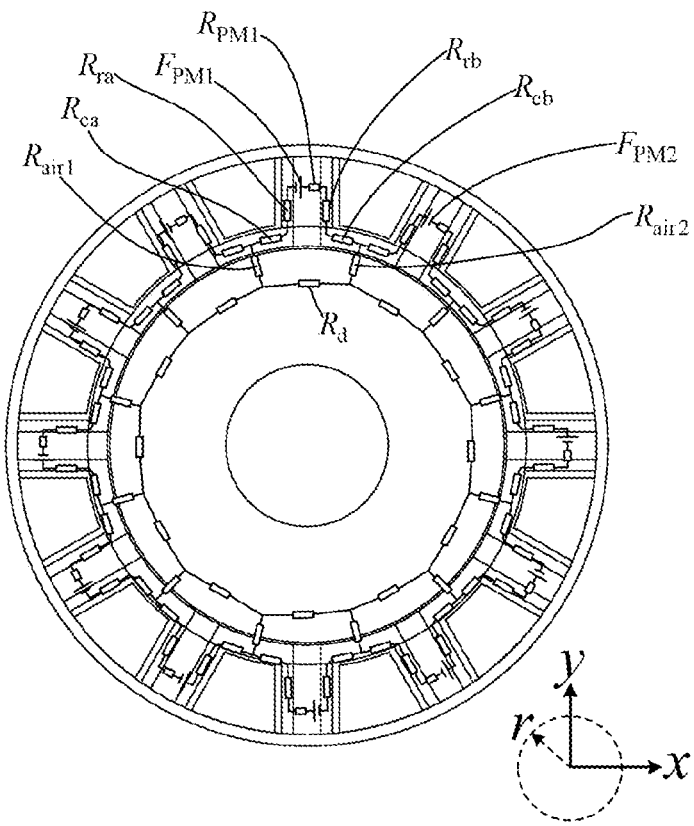
FIG. 10A is a schematic view of bias magnetic circuit and bias magnetic field adjustment on which the bias force adjustment is based in the specific embodiment III of the present invention.

FIG. 10 is a schematic diagram of bias magnetic circuit and bias magnetic field adjustment in this embodiment. FIG. 10A is a schematic diagram of a bias magnetic circuit. Based on the idea of an equivalent magnetic network, the stator permanent magnet, the magnetic conduction column, the magnetic collecting block, the air gap between the connecting section between magnetic collecting blocks and the magnetic field loop magnetic conduction block, the magnetic field loop magnetic conduction block and the connecting section between magnetic collecting blocks may be used as magnetic circuit components. According to the magnetic circuit structure, an equivalent bias magnetic circuit composed of each of the magnetic circuit components and connecting lines is obtained. The equivalent magnetomotive force of the stator permanent magnet 201 is $F_{PM1}$. The equivalent magnetic resistance of the stator permanent magnet 201 is $R_{PM1}$. The equivalent magnetic resistance of a left magnetic conduction column of the stator permanent magnet 201 is $R_{ra}$. The equivalent magnetic resistance of a right magnetic conduction column of the stator permanent magnet 201 is $R_{rb}$. The equivalent magnetic resistance of a left magnetic collecting block of the stator permanent magnet 201 is $R_{ca}$. The equivalent magnetic resistance of a right magnetic collecting block of the stator permanent magnet 201 is $R_{cb}$. The equivalent magnetic resistance of an air gap between the left magnetic collecting block of the stator permanent magnet 201 and the magnetic field loop magnetic conduction block is $R_{air1}$. The equivalent magnetic resistance of an air gap between the right magnetic collecting block of the stator permanent magnet 201 and the magnetic field loop magnetic conduction block is $R_{air2}$. The equivalent magnetic resistance of the magnetic field loop magnetic conduction block is Rd. The equivalent magnetic resistance of the stator permanent magnet 202 is $R_{PM2}$.

Figure 10B:
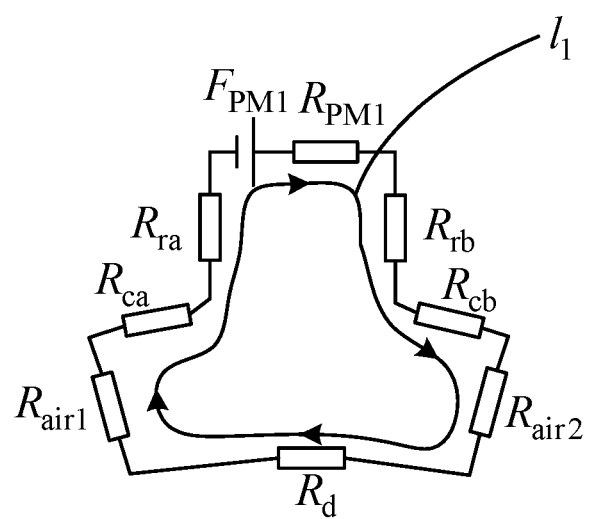
FIG. 10B is a schematic view in which a bias magnetic field is not adjusted.

As shown in FIG. 10B, taking a bias magnetic circuit of a stator permanent magnet as an object, the connection relationship between the components of the bias magnetic circuit formed by the single stator permanent magnet is shown in detail when the bias magnetic field is not adjusted. At this time, the connecting section between magnetic collecting blocks is preferably made of non-magnetic-conduction and low-conductivity materials with certain mechanical strength and hardness. By analyzing the equivalent magnetic circuit, it can be learned that when the bias magnetic field is not adjusted, an equivalent main magnetic flux II sequentially flows through the equivalent magnetomotive force $F_{PM1}$ of the stator permanent magnet 201, the equivalent magnetic resistance $R_{PM1}$ of the stator permanent magnet 201, the equivalent magnetic resistance $R_{rb}$ of the right magnetic conduction column of the stator permanent magnet 201, the equivalent magnetic resistance $R_{cb}$ of the right magnetic collecting block of the stator permanent magnet 201, the equivalent magnetic resistance $R_{air2}$ of the air gap between the right magnetic collecting block of the stator permanent magnet 201 and the magnetic field loop magnetic conduction block, the equivalent magnetic resistance Rd of the magnetic field loop magnetic conduction block, the equivalent magnetic resistance $R_{air1}$ of the air gap between the left magnetic collecting block of the stator permanent magnet 201 and the magnetic field loop magnetic conduction block, the equivalent magnetic resistance $R_{ca}$ of the left magnetic collecting block of the stator permanent magnet 201, and the equivalent magnetic resistance $R_{ra}$ of the left magnetic conduction column of the stator permanent magnet 201.

Figure 10C:
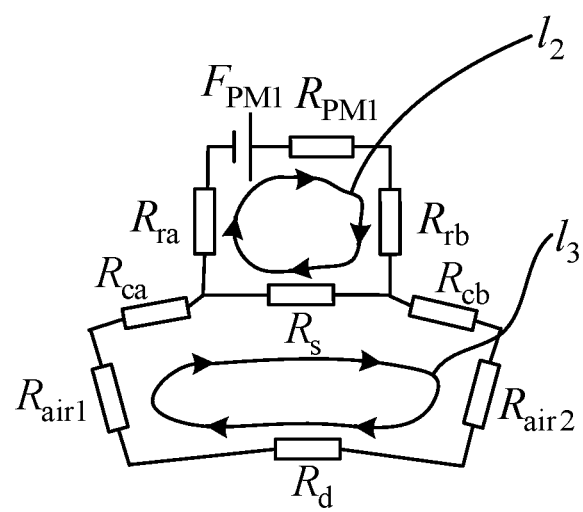
FIG. 10C is a schematic view in which a bias magnetic field is adjusted.

As shown in FIG. 10C, in order to achieve the purpose of adjusting the bias magnetic field, a connecting section 9 between magnetic collecting blocks is preferably made of magnetic conduction materials, and then, the equivalent magnetic resistance $R_s$ of a connecting section 28 between magnetic collecting blocks will be introduced into the equivalent magnetic circuit shown in FIG. 10B. By analyzing the equivalent magnetic circuit, it can be learned that there will be an equivalent main magnetic flux I 12 when the bias magnetic field is adjusted and an equivalent main magnetic flux II 13 when the bias magnetic field is adjusted. The equivalent main magnetic flux I 12 when the bias magnetic field is adjusted sequentially flows through the equivalent magnetomotive force $F_{PM1}$ of the stator permanent magnet 201, the equivalent magnetic resistance $R_{PM1}$ of the stator permanent magnet 201, the equivalent magnetic resistance $R_{rb}$ of the right magnetic conduction column of the stator permanent magnet 201, the equivalent magnetic resistance Rob of the right magnetic collecting block of the stator permanent magnet 201, the equivalent magnetic resistance $R_s$ of the connecting section 28 between magnetic collecting blocks, and the equivalent magnetic resistance $R_{ra}$ of the left magnetic conduction column of the stator permanent magnet 201. The equivalent main magnetic flux II 13 when the bias magnetic field is adjusted sequentially flows through the equivalent magnetic resistance $R_s$ of the connecting section 28 between magnetic collecting blocks, the equivalent magnetic resistance Rob of the right magnetic collecting block of the stator permanent magnet 201, the equivalent magnetic resistance $R_{air2}$ of the air gap between the right magnetic collecting block of the stator permanent magnet 201 and the magnetic field loop magnetic conduction block, the equivalent magnetic resistance Rd of the magnetic field loop magnetic conduction block, the equivalent magnetic resistance $R_{air1}$ of the air gap between the left magnetic collecting block of the stator permanent magnet 201 and the magnetic field loop magnetic conduction block, and the equivalent magnetic resistance Ra of the left magnetic collecting block of the stator permanent magnet 201.

Obviously, the magnitude of the equivalent main magnetic flux I 12 when the bias magnetic field is adjusted and the magnitude of the equivalent main magnetic flux II 13 when the bias magnetic field is adjusted may be adjusted by adjusting the magnitude of the equivalent magnetic resistance $R_s$ of the connecting section 28 between magnetic collecting blocks. The magnitude of the equivalent main magnetic flux II 13 when the bias magnetic field is adjusted determines the magnitude of the bias force that may be generated by the stator permanent magnet. There are many ways to adjust the magnitude of the equivalent magnetic resistance $R_s$ of the connecting section 28 between magnetic collecting blocks. Preferably, the connecting section 28 between magnetic collecting blocks is made of materials with good magnetic conductivity. By adjusting the volume of the connecting section 28 between magnetic collecting blocks embedded in two adjacent magnetic collecting blocks, the magnitude of the equivalent magnetic resistance $R_s$ of the connecting section 28 between magnetic collecting blocks may be adjusted, the volume of the connecting section 28 between magnetic collecting blocks embedded in two adjacent magnetic collecting blocks may be reduced, the magnetic conductivity may be reduced, and the equivalent magnetic resistance of the connecting section 28 between magnetic collecting blocks may be increased. On the contrary, the equivalent magnetic resistance may be reduced. There are two methods for adjusting the volume of the connecting section 28 between magnetic collecting blocks embedded in two adjacent magnetic collecting blocks. The first one is that the connecting section 28 between magnetic collecting blocks is directly cut to an appropriate axial length. The second one is that the connecting section 28 between magnetic collecting blocks is made into a magnetic collecting block with a wedge structure, and the magnetic collecting block with the wedge structure is moved back and forth in an axial direction to flexibly adjust the volume of the connecting section 28 between magnetic collecting blocks embedded in two adjacent magnetic collecting blocks.

Figure 11A:
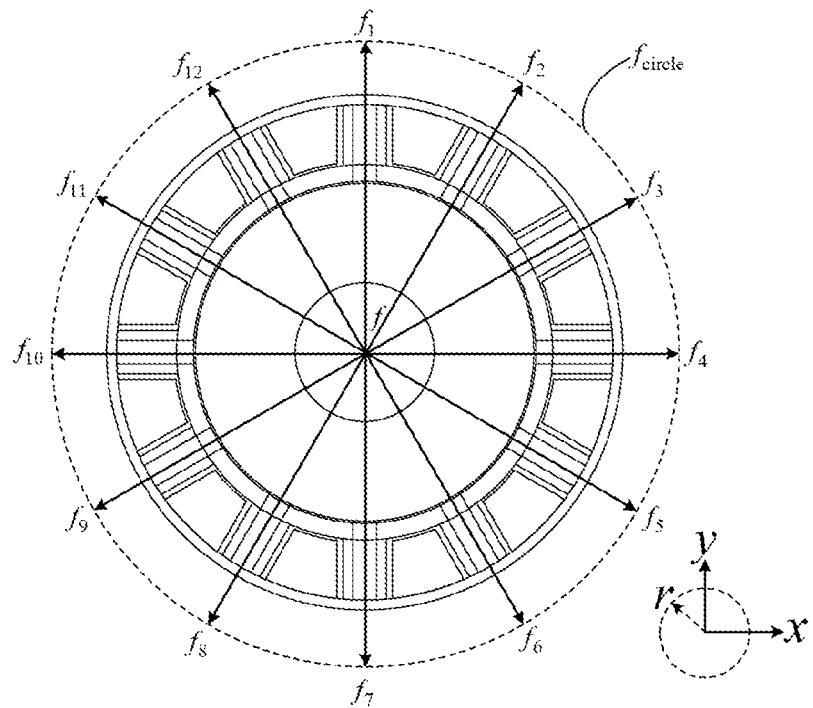
FIG. 11A is a schematic view of bias forces when the bias forces are not adjusted in the specific embodiment III of the present invention.

As shown in FIG. 11A, the bias forces generated by the 12 stator permanent magnets shown in FIG. 9 are respectively $f_1, f_2, \ldots, f_{12}$. It can be known from FIG. 10 that the 12 stator permanent magnets have the same equivalent bias magnetic circuit. Therefore, without adjusting the bias magnetic field and without considering the performance and magnetic characteristic differences between different stator permanent magnets, magnetic conduction columns, magnetic collecting blocks, air gaps between connecting sections between magnetic collecting blocks and magnetic field loop magnetic conduction blocks, and magnetic field loop magnetic conduction blocks, the magnitude relationship between $f_1, f_2, \ldots, f_{12}$ meets: $f_1=f_2=f_3=f_4=f_5=f_6=f_7=f_8=f_9=f_{10}=f_{11}=f_{12}$, and the angle difference is that 360°/12=30°. In fact, the performance and magnetic characteristics of different stator permanent magnets, magnetic conduction columns, magnetic collecting blocks, air gaps between connecting sections between magnetic collecting blocks and magnetic field loop magnetic conduction blocks, and magnetic field loop magnetic conduction blocks have slight differences, therefore, the magnitude relationship between $f_1, f_2, \ldots, f_{12}$ meets: $f_1 \approx f_2 \approx f_3 \approx f_4 \approx f_5 \approx f_6 \approx f_7 \approx f_8 \approx f_9 \approx f_{10} \approx f_{11} \approx f_{12}$, and the angle difference is approximately equal to 30°. Based on the above analysis, an equivalent circle $f_{circle}$ may be drawn, and the end points of the bias forces $f_1, f_2, \ldots, f_{12}$ are all located near the equivalent circle $f_{circle}$. At this time, the equivalent bias forces f of all magnetic poles are located in the center of the entire x-y plane.

Figure 11B:
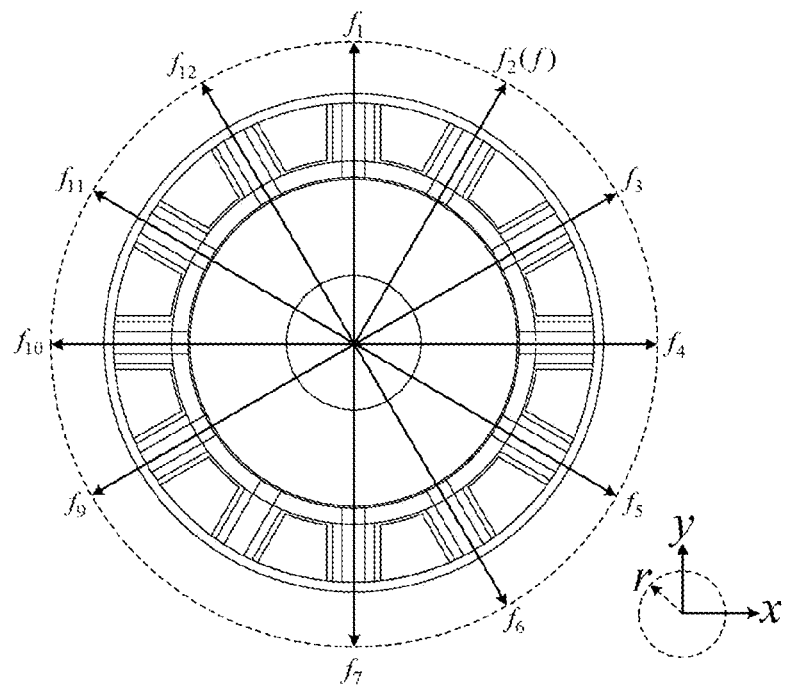
FIG. 11B is a schematic view I of bias forces when the bias forces are adjusted.

The connecting section 28 between magnetic collecting blocks in the bias magnetic circuit of the stator permanent magnet 208 shown in FIG. 9 is made of magnetic conduction materials, that is, the equivalent magnetic resistance $R_s$ of the connecting section 28 between magnetic collecting blocks is smaller. At this time, the equivalent main magnetic flux I 12 when the bias magnetic field is adjusted will be significantly greater than the equivalent main magnetic flux II 13 when the bias magnetic field is adjusted, and the equivalent main magnetic flux II 13 when the bias magnetic field is adjusted will be close to zero, that is, the bias force of the stator permanent magnet 308 is close to zero. All bias forces in the x-y plane are equated, and the equivalent bias forces f of all magnetic poles and $f_2$ are in the same direction and have the same magnitude. Specifically, an equivalent bias force f is generated in the first quadrant of the x-y plane. An included angle between the equivalent bias force f and the positive direction of the x axis is 60°, as shown in FIG. 11B.

Figure 11C:
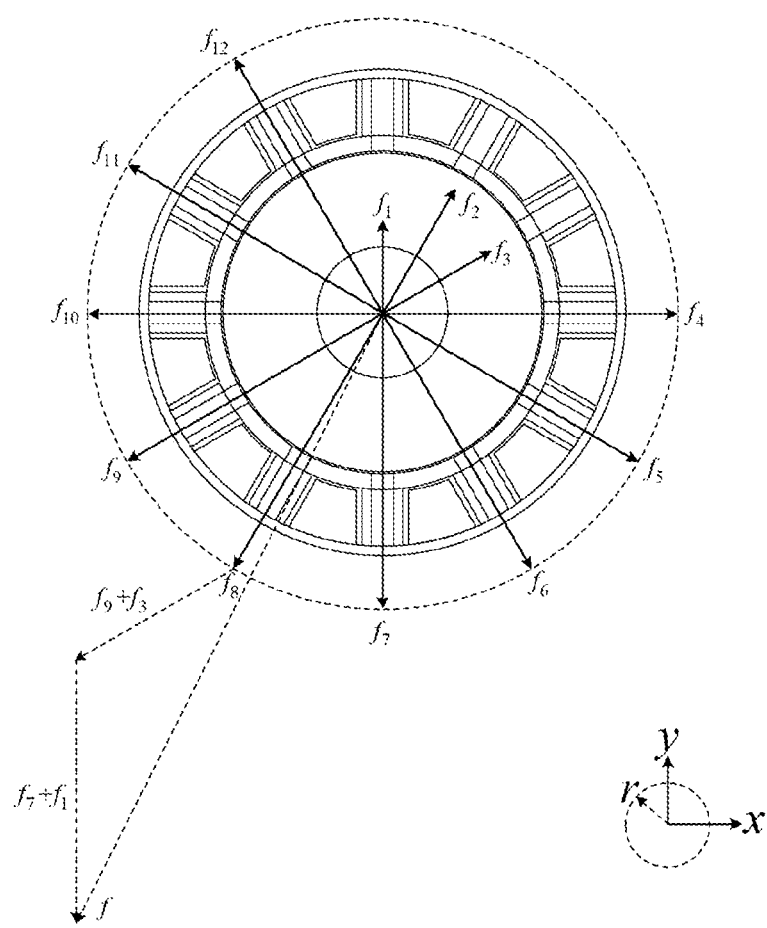
FIG. 11C is a schematic view II of bias forces when the bias forces are adjusted.

The connecting sections between magnetic collecting blocks in the bias magnetic circuits of the stator permanent magnet 201, the stator permanent magnet 202 and the stator permanent magnet 203 shown in FIG. 9 are made of magnetic conduction materials, but the volume of the connecting section between magnetic collecting blocks embedded in two adjacent magnetic collecting blocks is adjusted, so as to adjust the magnitude of the equivalent magnetic resistance $R_s$ of the connecting section between magnetic collecting blocks. The equivalent main magnetic flux I 12 when the bias magnetic field is adjusted and the equivalent main magnetic flux II 13 when the bias magnetic field is adjusted are reasonably distributed to enable the bias forces $f_1$, $f_2$ and $f_3$ of the stator permanent magnets 301, 302 and 303 to be different. All bias forces in the x-y plane are equated, an equivalent bias force f is generated in the third quadrant of the x-y plane. An included angle between the equivalent bias force f and the negative direction of the x axis is less than 60°, as shown in FIG. 11C.

In combination with the analysis in FIG. 9 and FIG. 10, it can be found that by reasonably adjusting the volume or material of the connecting section between magnetic collecting blocks embedded in two adjacent magnetic collecting blocks, the magnitude of the equivalent magnetic resistance $R_s$ of the connecting section between magnetic collecting blocks may be adjusted, thereby distributing the equivalent main magnetic flux I 12 when the bias magnetic field is adjusted and the equivalent main magnetic flux II 13 when the bias magnetic field is adjusted. By equating all bias forces in the x-y plane, an equivalent bias force f of any angle and magnitude may be obtained, thereby meeting the needs of bias magnetic fields which are not affected by installation angles and installation positions.

Figure 12A:
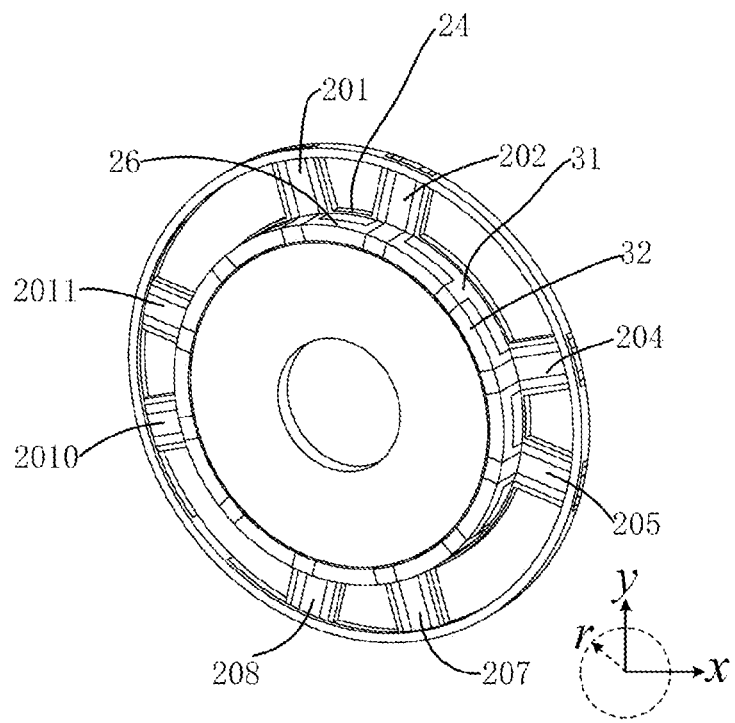
FIG. 12A is a schematic structural view of a bias magnetic circuit of a magnetic suspension bearing of an 8-pole stator permanent magnet motor in a specific embodiment IV of the present invention.
Figure 12B:
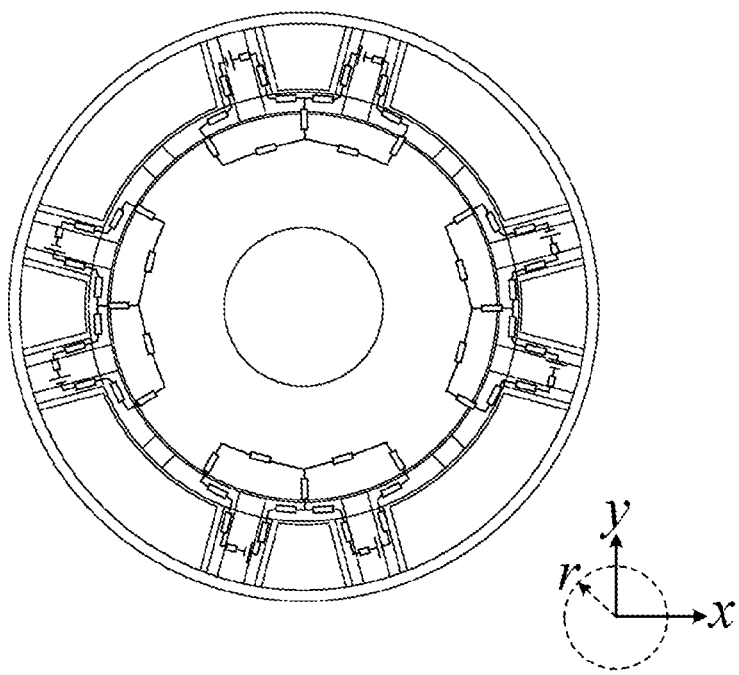
FIG. 12B is a schematic view of a bias magnetic circuit on which the bias force adjustment is based.

Specific Embodiment IV: Magnetic Suspension Bearing of 8-Pole Stator Permanent Magnet Motor with Adjustable Bias Magnetic Field In order to achieve the adjusting effect of the bias magnetic field in this embodiment, FIG. 12 shows an embodiment II in which only 8 bias magnetic circuit structures are arranged in the 12 stator permanent magnets, and different from FIG. 9, only 2 stator permanent magnets are selected on two sides of the x axis and the y axis. Without loss of generality, the stator permanent magnet 201, the stator permanent magnet 202, the stator permanent magnet 204, the stator permanent magnet 205, the stator permanent magnet 207, the stator permanent magnet 208, the stator permanent magnet 2010 and the stator permanent magnet 2011 are selected. A span between the stator permanent magnet 202 and the stator permanent magnet 204 is significantly greater than a span between the stator permanent magnet 201 and the stator permanent magnet 202. Therefore, a connecting section 31 between large-span magnetic collecting blocks and a large-span magnetic collecting block 32 are arranged between the stator permanent magnet 202 and the stator permanent magnet 204. The material and function of the connecting section 31 between large-span magnetic collecting blocks are the same as those of the intermediate fastening plate. The material and function of the large-span magnetic collecting block 32 are the same as those of the magnetic collecting block. The composition and principle of the bias magnetic circuit in FIG. 12B are similar to those in FIG. 10, and will not be repeated here.

Figure 13A:
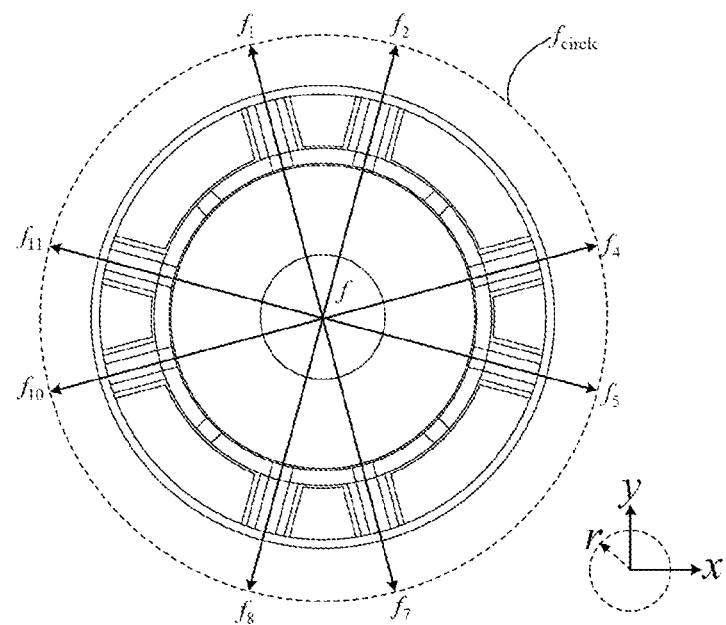
FIG. 13A is a schematic view of bias forces when the bias forces are not adjusted in the specific embodiment IV of the present invention.
Figure 13B:
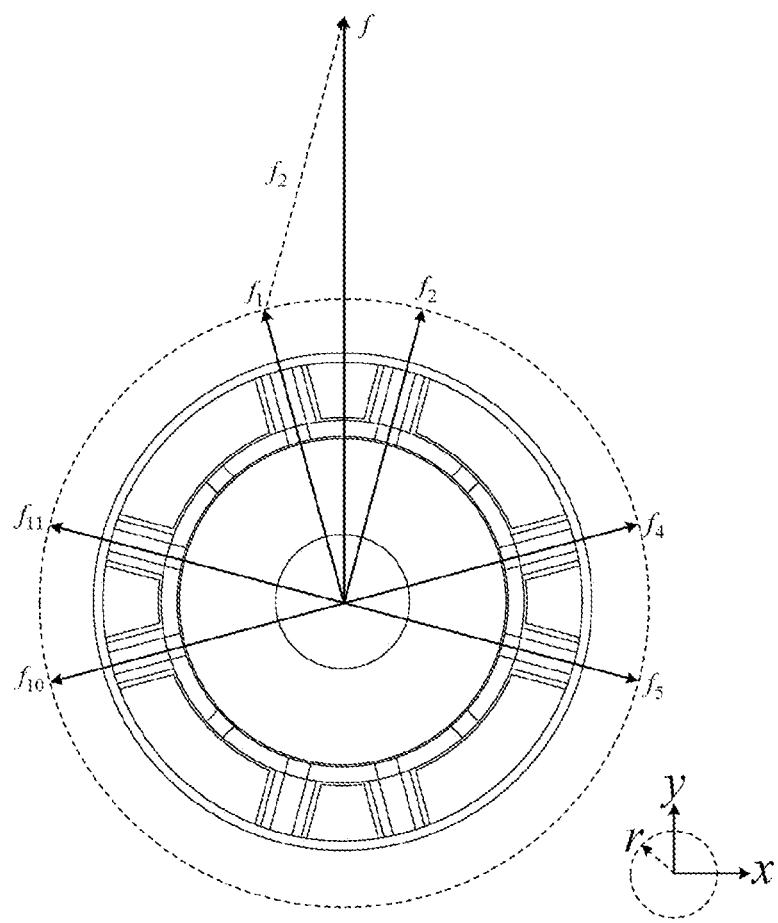
FIG. 13B is a schematic view of bias forces when the bias forces are adjusted.

As shown in FIG. 13A, the bias forces generated by the stator permanent magnet 201, the stator permanent magnet 202, the stator permanent magnet 204, the stator permanent magnet 205, the stator permanent magnet 207, the stator permanent magnet 208, the stator permanent magnet 2010 and the stator permanent magnet 2011 are respectively $f_1$, $f_2$, $f_4$, $f_5$, $f_7$, $f_8$, $f_{10}$ and $f_{11}$. Without adjusting the bias magnetic field and without considering the performance and magnetic characteristic differences between different stator permanent magnets, magnetic conduction columns, magnetic collecting blocks, air gaps between connecting sections between magnetic collecting blocks and magnetic field loop magnetic conduction blocks, and magnetic field loop magnetic conduction blocks, the magnitude relationship between the bias forces of all magnetic poles meets: $f_1=f_2=f_4=f_5=f_7=f_8=f_{10}=f_{11}$, and the angle difference is 30° or 60°.

Considering that the performance and magnetic characteristics of different stator permanent magnets, magnetic conduction columns, magnetic collecting blocks, air gaps between connecting sections between magnetic collecting blocks and magnetic field loop magnetic conduction blocks, and magnetic field loop magnetic conduction blocks have slight differences, the magnitude relationship between the bias forces of all magnetic poles meets: $f_1 \approx f_2 \approx f_4 \approx f_5 \approx f_7 \approx f_8 \approx f_{10} \approx f_{11}$, and the angle difference is approximately equal to 30° or 60°. Based on the above analysis, an equivalent circle $f_{circle}$ may be drawn, and the end points of the bias forces of all magnetic poles are all located near the equivalent circle $f_{circle}$. At this time, the equivalent bias forces f of all magnetic poles are located in the center of the entire x-y plane.

The connecting sections between magnetic collecting blocks in the bias magnetic circuits of the stator permanent magnet 207 and the stator permanent magnet 208 are made of magnetic conduction materials, that is, the equivalent magnetic resistance $R_s$ of the connecting section between magnetic collecting blocks is smaller. At this time, the equivalent main magnetic flux I 12 when the bias magnetic field is adjusted will be significantly greater than the equivalent main magnetic flux II 13 when the bias magnetic field is adjusted, and the equivalent main magnetic flux II 13 when the bias magnetic field is adjusted will be close to zero, that is, the bias forces of the stator permanent magnet 207 and the stator permanent magnet 208 are close to zero. All bias forces in the x-y plane are equated, and the equivalent bias forces f of all magnetic poles are located on an axis in the positive direction of the y axis, that is, between the bias force $f_1$ of the stator permanent magnet 207 and the bias force $f_1$ of the stator permanent magnet 208.

Comparing the embodiment III and the embodiment IV, the two embodiments have respective characteristics. For example, in the embodiment III, 12 bias magnetic circuits are used, so that the fault-tolerant ability is higher, and the influence of installation angles and installation positions may be avoided. Through the 12 bias magnetic circuits, the equivalent bias forces f of all magnetic poles of any angle and magnitude may be combined, but at the same time, it means that the axial length of the 12 stator permanent magnets exceeds the axial length of the stator core. In some occasions where it is only necessary to generate a bias force overcoming the gravity, the connecting section between magnetic collecting blocks with magnetic conductivity is used for adjusting the bias magnetic field and the bias force, resulting in the problem of energy waste of the permanent magnetic field. In the embodiment IV, the axial length of only 8 stator permanent magnets exceeds the axial length of the stator core, which has the advantage of saving the stator permanent magnets.

Based on the above analysis, the magnetic pole bypass in the present invention has the characteristics of intuitive principle and compact structure. The space at the end of the motor stator winding coil is effectively used. A bias magnetic field is provided for the permanent magnet bias type magnetic suspension bearing. Two adjacent magnetic poles form a magnetic field closed main loop through the magnetic pole bypass. The magnetic suspension bearing rotor has a high material use ratio, a low coupling degree and a good fault-tolerant ability. Those skilled in the art can be inspired by the embodiment III and the embodiment IV to design different numbers of bias magnetic circuits, thereby meeting the needs of bias magnetic fields at different installation angles and installation positions of the permanent magnet bias type magnetic suspension bearing and the stator permanent magnet motor.

The above embodiments are only four embodiments of the present invention. More specifically, a stator permanent magnet motor with 12 stator permanent magnets is implemented. At the same time, an x-y-z three-dimensional coordinate system is defined. Based on the motor, two typical permanent magnet bias type magnetic suspension bearings, namely a permanent magnet bias type axial magnetic suspension bearing 12a and a permanent magnet bias type radial magnetic suspension bearing 12b, are designed. 12 bias magnetic circuits, 8 bias magnetic circuit structures and schematic diagrams for magnetic field adjustment are given. However, the above four embodiments are not intended to limit the present invention. Any modification, equivalent replacement and improvement made within the spirit and principle of the present invention shall be included in the protection scope of the present invention. Modifications, equivalent replacements and improvements made by those skilled in the art based on the inventive concept of the present invention include but are not limited to: the number of motor stator permanent magnets is modified to other reasonable numbers, or the bias magnetic circuit is designed to other reasonable structures, or one or more of a permanent magnet bias type axial magnetic suspension bearing, a permanent magnet bias type radial magnetic suspension bearing and a permanent magnet bias type radial and axial hybrid magnetic suspension bearing are designed based on the bias magnetic circuit, as long as the bias magnetic circuit is used and the adjusting principle of the bias magnetic field of the present invention is used, the magnetic field energy of the permanent magnet of the stator permanent magnet motor is introduced into the magnetic suspension bearing, and the magnetic field energy in the magnetic pole bypass is used as the bias magnetic field.

What is claimed is:

1. A magnetic bearing of a stator permanent magnet motor with magnetic pole bypasses, comprising: a magnetic suspension bearing rotor assembled on a motor rotating shaft, a connecting and fastening section with a base section, inter-shoe sections and inter-bridge sections, magnetic poles evenly distributed in a circumferential direction, and magnetic pole bypasses with U-shaped magnetic conduction bridges evenly distributed in a circumferential direction, wherein the base section of the connecting and fastening section is of a ring structure, the inter-shoe sections are of structures evenly distributed on the base section and extending in an axial direction, the inter-bridge sections are of structures evenly distributed on the base section and extending in an axial direction, the magnetic poles are embedded between adjacent inter-shoe sections of the connecting and fastening section, the U-shaped magnetic conduction bridges are embedded between adjacent inter-bridge sections of the connecting and fastening section, the magnetic suspension bearing rotor is embedded in an annular space formed after the magnetic poles are distributed in a circumferential direction, the magnetic poles have circumferential magnetic conduction shoe structures, two adjacent U-shaped magnetic conduction bridges are fit to two sides in a radial direction of a same permanent magnet section extending out of a core, each of the U-shaped magnetic conduction bridges is assembled on the connecting and fastening section and then fit to a circumferential magnetic conduction shoe structure, a circumferential distance between the two adjacent U-shaped magnetic conduction bridges is w2, and a circumferential distance between adjacent circumferential magnetic conduction shoe structures is w1, w1≥w2, or 0.5×w2≤w1<w2.

2. The magnetic bearing of a stator permanent magnet motor with magnetic pole bypasses according to claim 1, wherein the U-shaped magnetic conduction bridge comprises two radial magnetic conduction bridges and a circumferential magnetic conduction bridge, and the two radial magnetic conduction bridges are fit to the circumferential magnetic conduction bridge to form the U-shaped magnetic conduction bridge.

3. The magnetic bearing of a stator permanent magnet motor with magnetic pole bypasses according to claim 1, wherein the U-shaped magnetic conduction bridge comprises two radial magnetic conduction columns and a circumferential magnetic conduction bridge extending in an axial direction to the circumferential magnetic conduction shoe structure, and the two radial magnetic conduction columns are fit to the circumferential magnetic conduction bridge to form the U-shaped magnetic conduction bridge.

4. The magnetic bearing of a stator permanent magnet motor with magnetic pole bypasses according to claim 3, wherein a U-shaped magnetic conduction column fastening plate is assembled between two radial magnetic conduction columns of the U-shaped magnetic conduction bridge, an intermediate fastening plate is assembled in a space in which the two radial magnetic conduction columns extend to the circumferential magnetic conduction shoe structure in an axial direction, and a connecting section between magnetic collecting blocks is embedded between two adjacent circumferential magnetic conduction shoe structures.

5. A bias force adjusting method of the magnetic bearing of a stator permanent magnet motor with magnetic pole bypasses according to claim 3, wherein a magnetic field loop magnetic conduction block is arranged on a radial inner side of the circumferential magnetic conduction shoe structure and a connecting section between magnetic collecting blocks, and a volume of the connecting section between magnetic collecting blocks embedded in two adjacent circumferential magnetic conduction shoe structures is adjusted to change equivalent magnetic resistance of the connecting section between magnetic collecting blocks.

6. The bias force adjusting method of the magnetic bearing of a stator permanent magnet motor with magnetic pole bypasses according to claim 5, wherein a method for adjusting the volume of the connecting section between magnetic collecting blocks embedded in two adjacent circumferential magnetic conduction shoe structures to change the equivalent magnetic resistance of the connecting section between magnetic collecting blocks comprises: reducing the volume of the connecting section between magnetic collecting blocks embedded in two adjacent circumferential magnetic conduction shoe structures to increase the equivalent magnetic resistance of the connecting section between magnetic collecting blocks, and increasing the volume of the connecting section between magnetic collecting blocks embedded in two adjacent circumferential magnetic conduction shoe structures to reduce the equivalent magnetic resistance of the connecting section between magnetic collecting blocks.

7. The magnetic bearing of a stator permanent magnet motor with magnetic pole bypasses according to claim 1, wherein when the magnetic bearing of the stator permanent magnet motor is an axial bearing, the magnetic suspension bearing rotor comprises a front subsection, a thrust disc and a rear subsection formed integrally, the magnetic pole comprises a front magnetic pole and a rear magnetic pole in an "opposite L" structure, radial outer ends of the front magnetic pole and the rear magnetic pole are fit to the circumferential magnetic conduction shoe structure, the thrust disc is assembled in a gap of the "opposite L" structure formed by the front magnetic pole and the rear magnetic pole, the front magnetic pole is wound with a front axial coil, and the rear magnetic pole is wound with a rear axial coil.

8. The magnetic bearing of a stator permanent magnet motor with magnetic pole bypasses according to claim 1, wherein when the magnetic bearing of the stator permanent magnet motor is a radial bearing, the magnetic pole is a magnetic pole with a T-shaped structure, and a radial outer end of the magnetic pole with a T-shaped structure is fit to the circumferential magnetic conduction shoe structure.

9. A magnetic suspension bearing motor system, comprising a stator structure, a stator winding coil and the magnetic bearing of a stator permanent magnet motor with magnetic pole bypasses according to claim 1, wherein the stator structure comprises modular stator cores evenly distributed in a circumferential direction, a stator permanent magnet is embedded between two adjacent modular stator cores, the permanent magnet section of each of the stator permanent magnets extending out of the core is fit to two U-shaped magnetic conduction bridges, and a distance for electrical insulation is kept between an end of the stator winding coil and the circumferential magnetic conduction shoe structure.

* * * * *